United States Patent
Ford et al.

(10) Patent No.: US 12,424,228 B2
(45) Date of Patent: Sep. 23, 2025

(54) METHODS AND USER INTERFACES FOR MANAGING AUDIO CHANNELS

(71) Applicant: Apple Inc., Cupertino, CA (US)

(72) Inventors: Jarrett A. Ford, Alameda, CA (US); Andrew T. Aude, San Francisco, CA (US); Jae Woo Chang, Cupertino, CA (US); Kevin J. Ferrell, Alexandria, VA (US)

(73) Assignee: Apple Inc., Cupertino, CA (US)

( * ) Notice: Subject to any disclaimer, the term of this patent is extended or adjusted under 35 U.S.C. 154(b) by 311 days.

(21) Appl. No.: 18/105,199

(22) Filed: Feb. 2, 2023

(65) Prior Publication Data

US 2023/0395082 A1 Dec. 7, 2023

Related U.S. Application Data

(60) Provisional application No. 63/348,636, filed on Jun. 3, 2022.

(51) Int. Cl.
*G10L 19/008* (2013.01)
*G06F 3/16* (2006.01)
*H04S 3/00* (2006.01)

(52) U.S. Cl.
CPC ............ *G10L 19/008* (2013.01); *G06F 3/165* (2013.01); *H04S 3/008* (2013.01); *H04S 2400/01* (2013.01)

(58) Field of Classification Search
CPC ....... G10L 19/008; G06F 3/165; H04S 3/008; H04S 2400/01
USPC .......................................... 381/22
See application file for complete search history.

(56) References Cited

U.S. PATENT DOCUMENTS

2009/0249247 A1* 10/2009 Tseng ...................... H04W 4/50 715/835
2012/0185547 A1 7/2012 Hugg et al.
2018/0338026 A1 11/2018 Jon et al.

OTHER PUBLICATIONS

International Preliminary Report on Patentability received for PCT Patent Application No. PCT/US2023/021674, mailed on Dec. 12, 2024, 13 pages.
International Search Report and Written Opinion received for PCT Patent Application No. PCT/US2023/021674, mailed on Aug. 11, 2023, 16 pages.

\* cited by examiner

*Primary Examiner* — Vivian C Chin
*Assistant Examiner* — Douglas J Suthers
(74) *Attorney, Agent, or Firm* — DLA Piper LLP (US)

(57) ABSTRACT

The present disclosure generally relates to methods for managing audio channels for multiple applications using an audio channel management user interface that is generated by system software. In some embodiments, the audio channel management user interface enables a first type of operation associated with the application which is currently managing the audio channel.

48 Claims, 19 Drawing Sheets

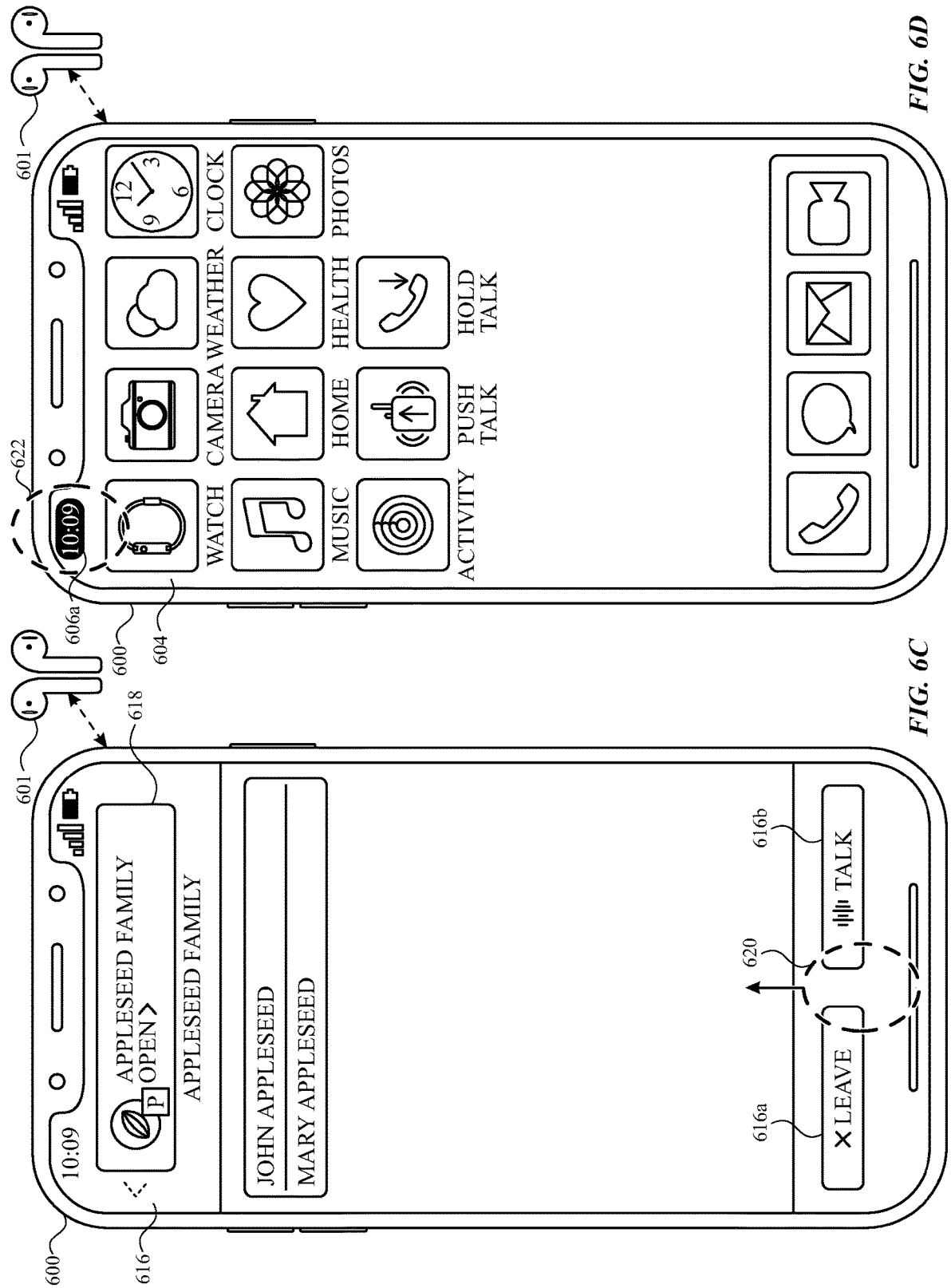

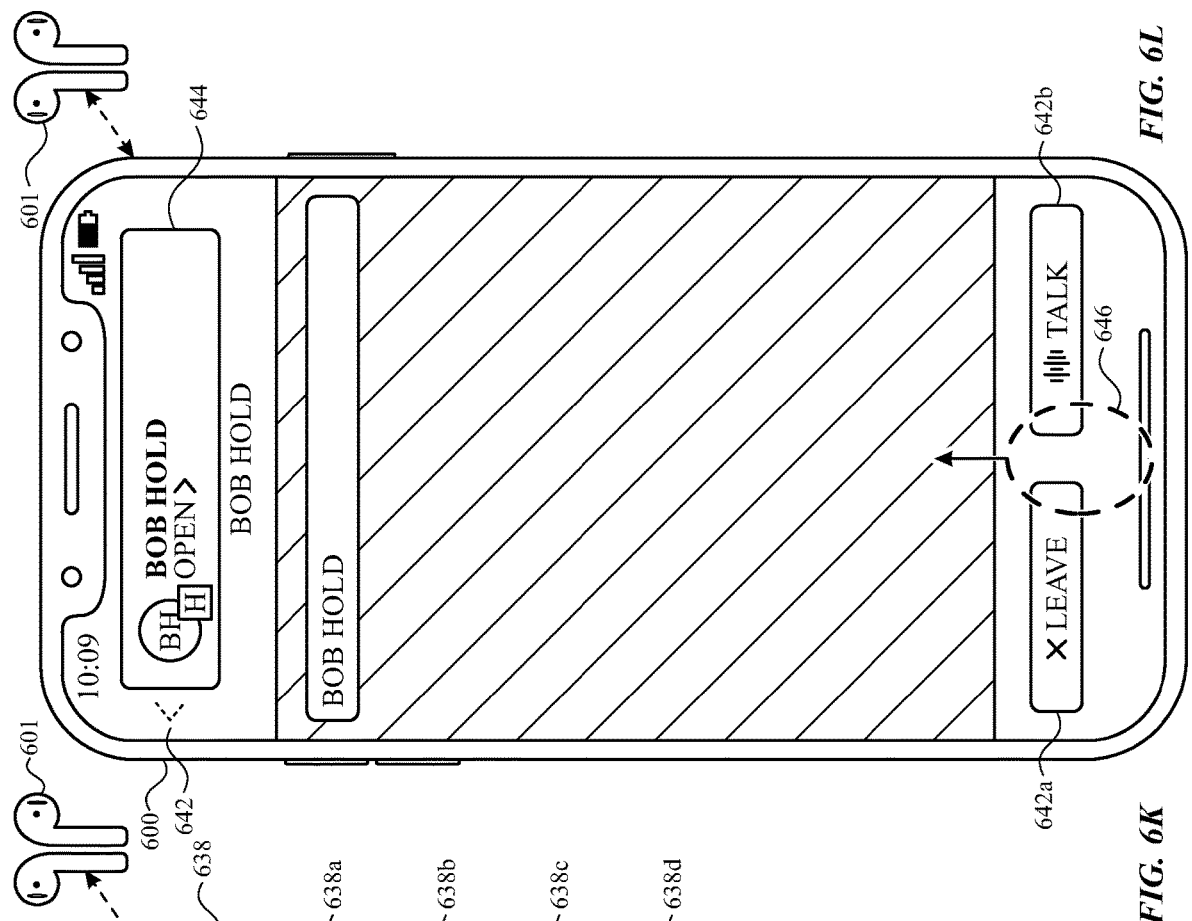
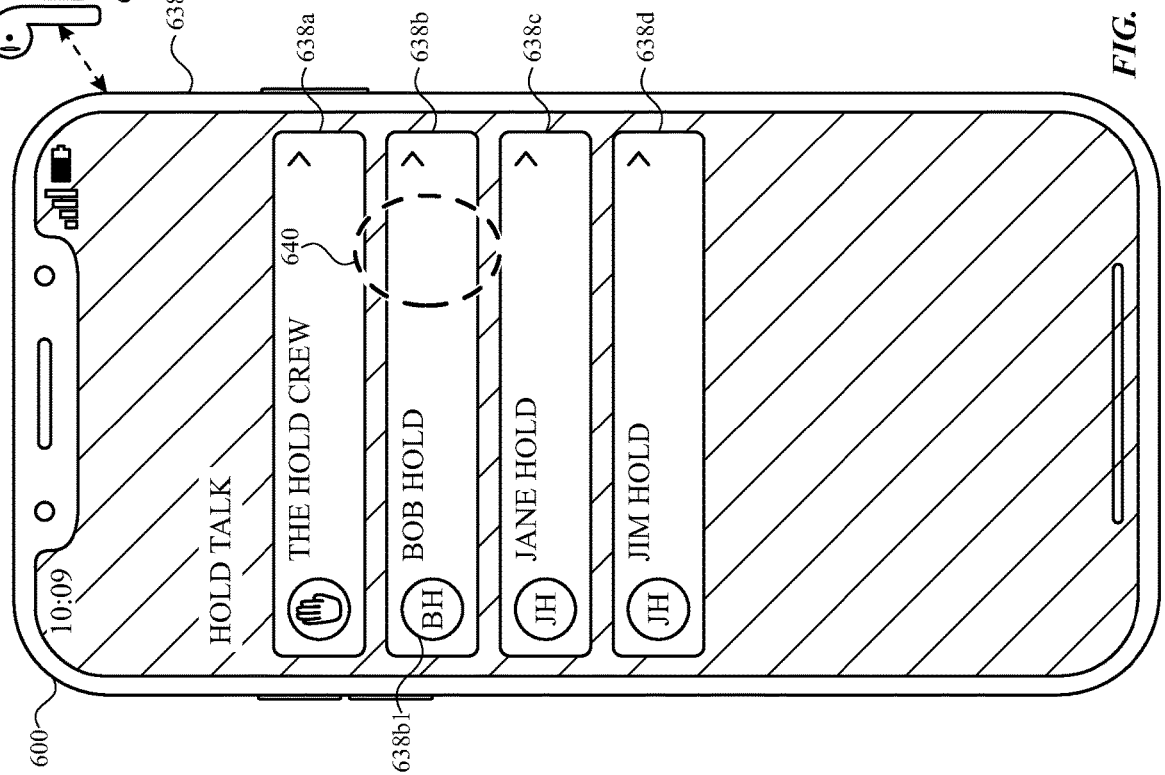
FIG. 6K
FIG. 6L

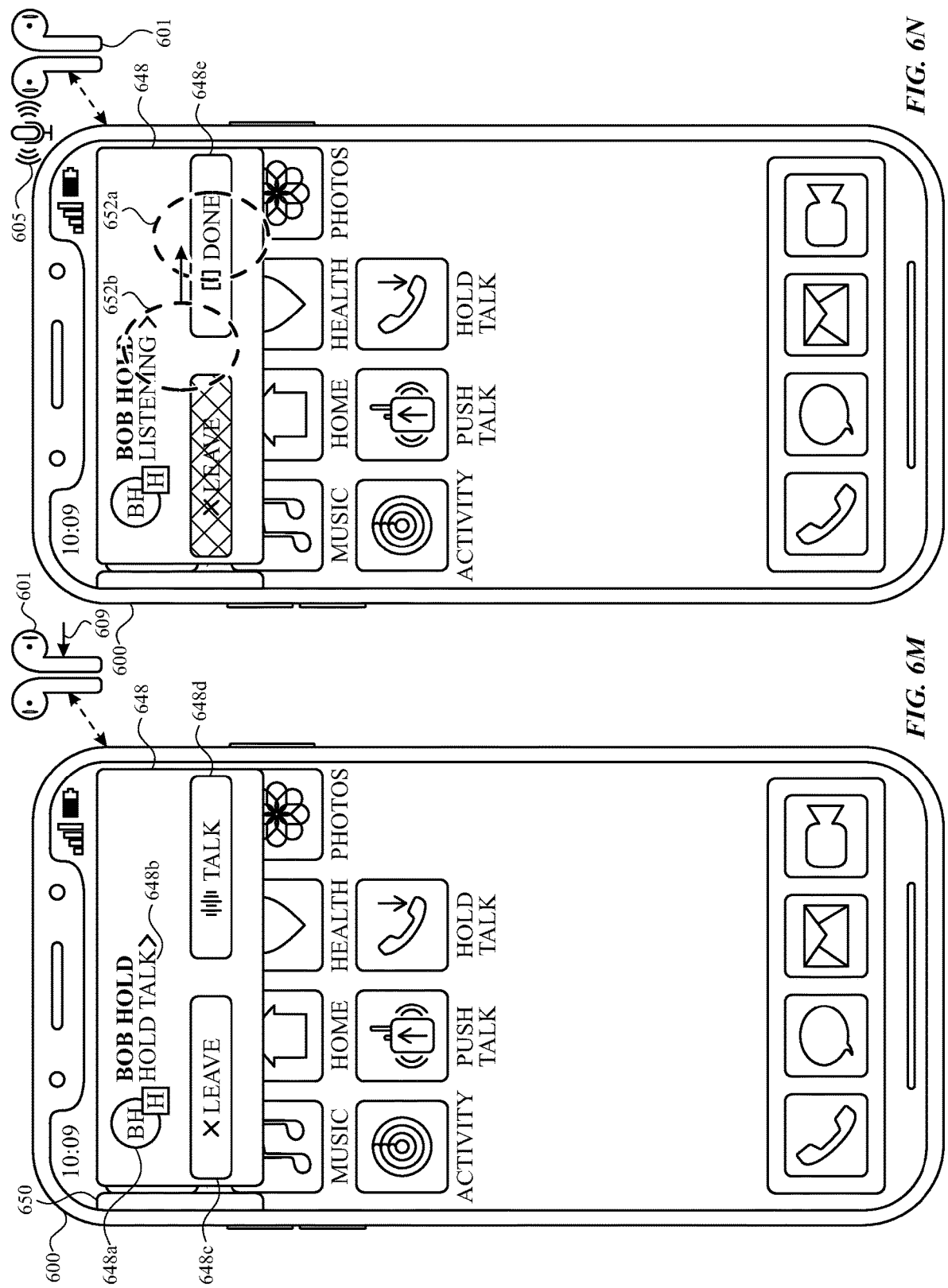

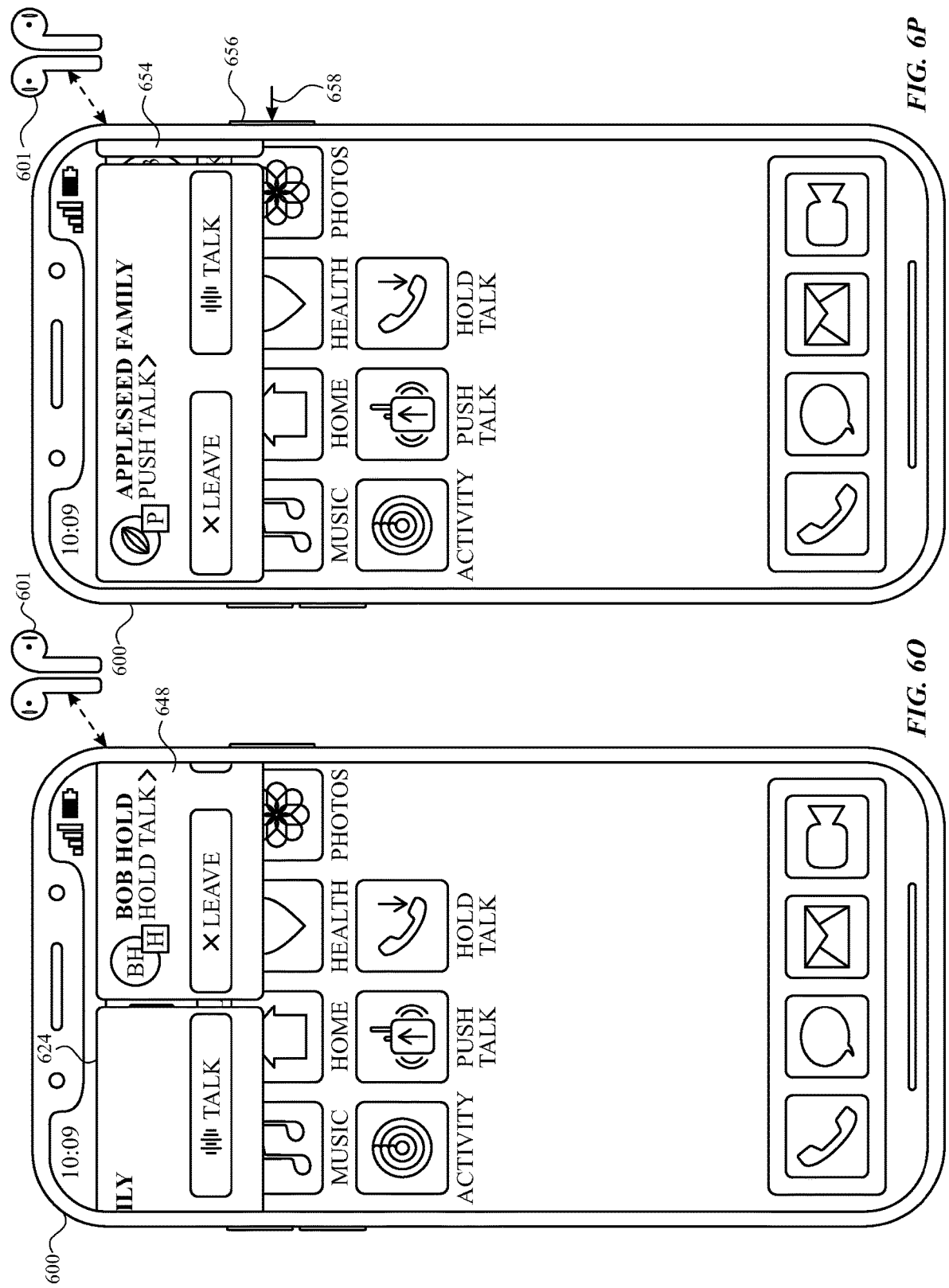

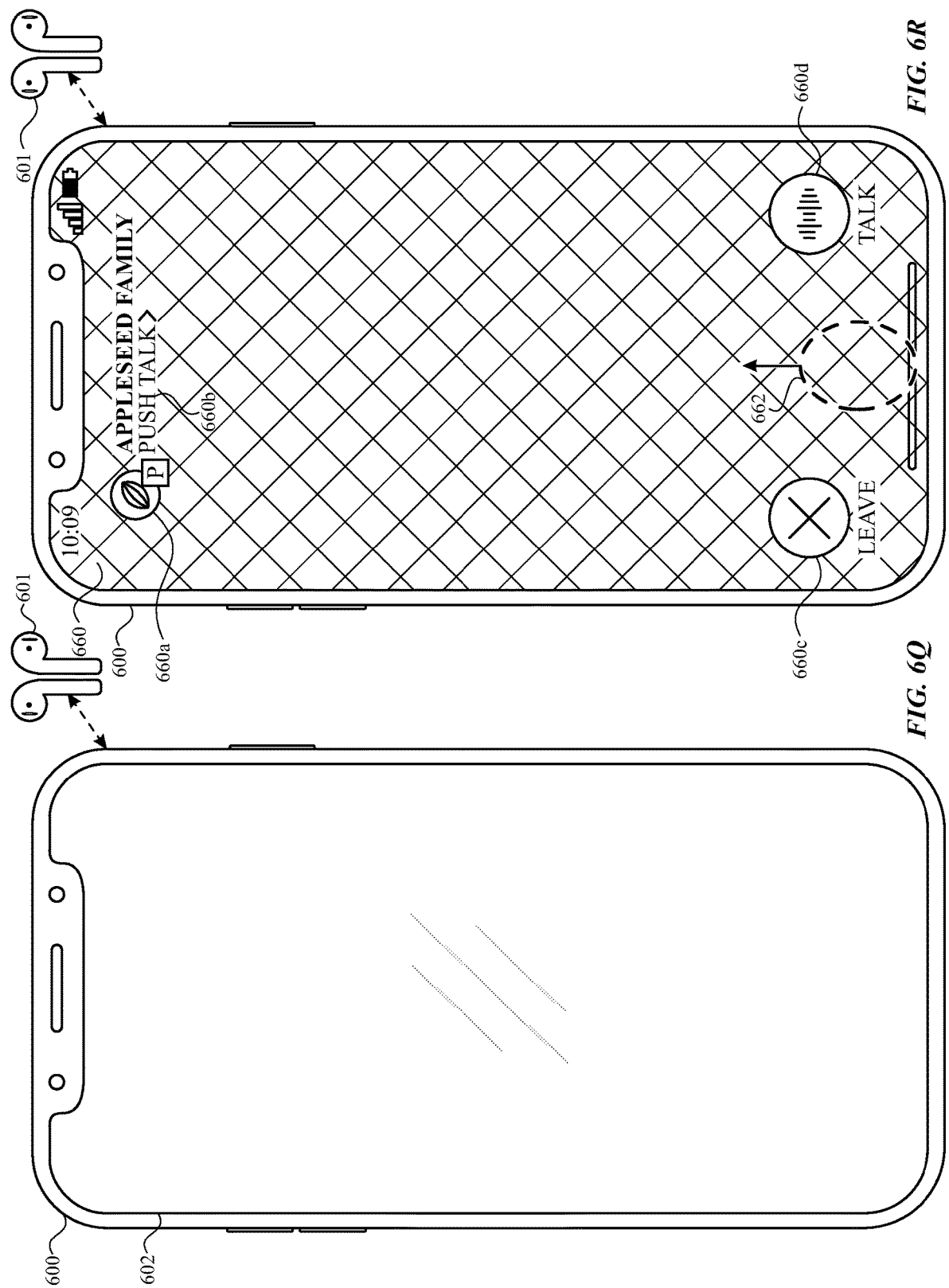

700

702
while an audio channel is open to send audio messages from the computer system and to receive audio messages at the computer system:

704
display a system user interface that is generated by system software

706
while displaying the system user interface, detect, via the input device, a first input

708
in response to detecting the first input, display an audio channel management user interface

710
while displaying the audio channel management user interface, detect a second input directed to the first selectable option

712
in response to detecting the second input, perform a first operation of the first type of operation associated with the audio channel, including:

714
in accordance with a determination that the audio channel is being managed by a first application, the first operation of the first type is associated with the first application

716
in accordance with a determination that the audio channel is being managed by a second application that is different from the first application, the first operation of the first type is associated with the second application

*FIG. 7*

METHODS AND USER INTERFACES FOR MANAGING AUDIO CHANNELS

CROSS-REFERENCE TO RELATED APPLICATIONS

This application claims priority to U.S. Provisional Application No. 63/348,636 filed Jun. 3, 2022, the entire contents of which are hereby incorporated by reference.

FIELD

The present disclosure relates generally to computer user interfaces, and more specifically to techniques for managing audio channels.

BACKGROUND

An electronic device can open an audio channel to allow a user to communicate with a user of another electronic device. While the audio channel is open, a user interface can be used to manage one or more operations and/or functions of the open audio channel.

BRIEF SUMMARY

Some techniques for managing audio channels using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing audio channels. Such methods and interfaces optionally complement or replace other methods for managing audio channels. The present technique also provides a consistent user interface for managing audio channels opened with, and/or managed by, different applications. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with a display generation component and an input device is described. The method comprises: while an audio channel is open to send audio messages from the computer system and to receive audio messages at the computer system: displaying, via the display generation component, a system user interface that is generated by system software; while displaying the system user interface detecting, via the input device, a first input; in response to detecting the first input, displaying, via the display generation component, an audio channel management user interface that is generated by the system software, wherein the audio channel management user interface includes a first selectable option that, when selected, causes the computer system to perform a first type of operation associated with the audio channel; while displaying the audio channel management user interface, detecting a second input directed to the first selectable option; and in response to detecting the second input, performing a first operation of the first type of operation associated with the audio channel, including: in accordance with a determination that the audio channel is being managed by a first application, the first operation of the first type is associated with the first application; and in accordance with a determination that the audio channel is being managed by a second application that is different from the first application, the first operation of the first type is associated with the second application.

In accordance with some embodiments, a non-transitory computer-readable storage medium is described. The non-transitory computer-readable storage medium stores one or more programs configured to be executed by one or more processors of a computer system that is in communication with a display generation component and an input device, the one or more programs including instructions for: while an audio channel is open to send audio messages from the computer system and to receive audio messages at the computer system: displaying, via the display generation component, a system user interface that is generated by system software; while displaying the system user interface detecting, via the input device, a first input; in response to detecting the first input, displaying, via the display generation component, an audio channel management user interface that is generated by the system software, wherein the audio channel management user interface includes a first selectable option that, when selected, causes the computer system to perform a first type of operation associated with the audio channel; while displaying the audio channel management user interface, detecting a second input directed to the first selectable option; and in response to detecting the second input, performing a first operation of the first type of operation associated with the audio channel, including: in accordance with a determination that the audio channel is being managed by a first application, the first operation of the first type is associated with the first application; and in accordance with a determination that the audio channel is being managed by a second application that is different from the first application, the first operation of the first type is associated with the second application.

In accordance with some embodiments, a transitory computer-readable storage medium is described. The non-transitory computer-readable storage medium stores one or more programs configured to be executed by one or more processors of a computer system that is in communication with a display generation component and an input device, the one or more programs including instructions for: while an audio channel is open to send audio messages from the computer system and to receive audio messages at the computer system: displaying, via the display generation component, a system user interface that is generated by system software; while displaying the system user interface detecting, via the input device, a first input; in response to detecting the first input, displaying, via the display generation component, an audio channel management user interface that is generated by the system software, wherein the audio channel management user interface includes a first selectable option that, when selected, causes the computer system to perform a first type of operation associated with the audio channel; while displaying the audio channel management user interface, detecting a second input directed to the first selectable option; and in response to detecting the second input, performing a first operation of the first type of operation associated with the audio channel, including: in accordance with a determination that the audio channel is being managed by a first application, the first operation of the first type is associated with the first application; and in accordance with a determination that the audio channel is being managed by a second application that is different from the first application, the first operation of the first type is associated with the second application.

In accordance with some embodiments, a computer system is described. The computer system comprises one or more processors, wherein the computer system is in communication with a display generation component and an input device; and memory storing one or more programs configured to be executed by the one or more processors, the one or more programs including instructions for: while an audio channel is open to send audio messages from the computer system and to receive audio messages at the computer system: displaying, via the display generation component, a system user interface that is generated by system software; while displaying the system user interface detecting, via the input device, a first input; in response to detecting the first input, displaying, via the display generation component, an audio channel management user interface that is generated by the system software, wherein the audio channel management user interface includes a first selectable option that, when selected, causes the computer system to perform a first type of operation associated with the audio channel; while displaying the audio channel management user interface, detecting a second input directed to the first selectable option; and in response to detecting the second input, performing a first operation of the first type of operation associated with the audio channel, including: in accordance with a determination that the audio channel is being managed by a first application, the first operation of the first type is associated with the first application; and in accordance with a determination that the audio channel is being managed by a second application that is different from the first application, the first operation of the first type is associated with the second application.

In accordance with some embodiments, a computer system is described. The computer system is in communication with a display generation component and an input device. The computer system comprises means, while an audio channel is open to send audio messages from the computer system and to receive audio messages at the computer system, for: displaying, via the display generation component, a system user interface that is generated by system software; while displaying the system user interface detecting, via the input device, a first input; in response to detecting the first input, displaying, via the display generation component, an audio channel management user interface that is generated by the system software, wherein the audio channel management user interface includes a first selectable option that, when selected, causes the computer system to perform a first type of operation associated with the audio channel; while displaying the audio channel management user interface, detecting a second input directed to the first selectable option; and in response to detecting the second input, performing a first operation of the first type of operation associated with the audio channel, including: in accordance with a determination that the audio channel is being managed by a first application, the first operation of the first type is associated with the first application; and in accordance with a determination that the audio channel is being managed by a second application that is different from the first application, the first operation of the first type is associated with the second application.

In accordance with some embodiments, a computer program product is described. The computer program product comprises one or more programs configured to be executed by one or more processors of a computer system that is in communication with a display generation component and an input device, the one or more programs including instructions for: while an audio channel is open to send audio messages from the computer system and to receive audio messages at the computer system: displaying, via the display generation component, a system user interface that is generated by system software; while displaying the system user interface detecting, via the input device, a first input; in response to detecting the first input, displaying, via the display generation component, an audio channel management user interface that is generated by the system software, wherein the audio channel management user interface includes a first selectable option that, when selected, causes the computer system to perform a first type of operation associated with the audio channel; while displaying the audio channel management user interface, detecting a second input directed to the first selectable option; and in response to detecting the second input, performing a first operation of the first type of operation associated with the audio channel, including: in accordance with a determination that the audio channel is being managed by a first application, the first operation of the first type is associated with the first application; and in accordance with a determination that the audio channel is being managed by a second application that is different from the first application, the first operation of the first type is associated with the second application.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing audio channels, thereby increasing the effectiveness, efficiency, and user satisfaction with such devices. Such methods and interfaces may complement or replace other methods for managing audio channels.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 7 is a block diagram of a system for managing audio channels in accordance with some embodiments.

DESCRIPTION OF EMBODIMENTS

Figure 1A:
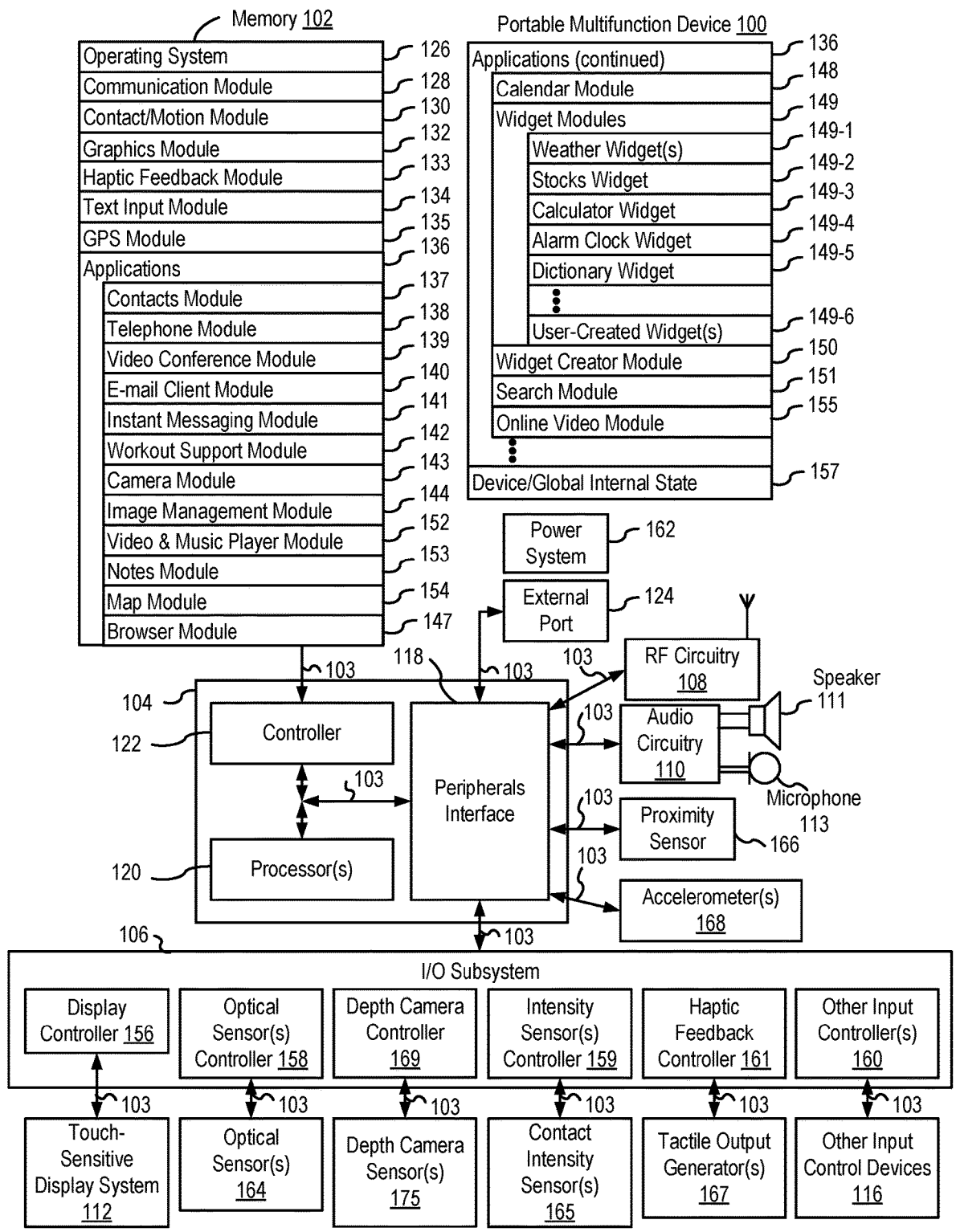
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing audio channels. Such techniques can reduce the cognitive burden on a user who accesses audio channels, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing audio channels. FIGS. 6A-6S illustrate exemplary user interfaces for managing audio channels. FIG. 7 is a flow diagram illustrating methods of managing audio channels in accordance with some embodiments. The user interfaces in FIGS. 6A-6S are used to illustrate the processes described below, including the processes in FIG. 7.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, providing a consistent user interface and user experience, improves security, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety.

In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
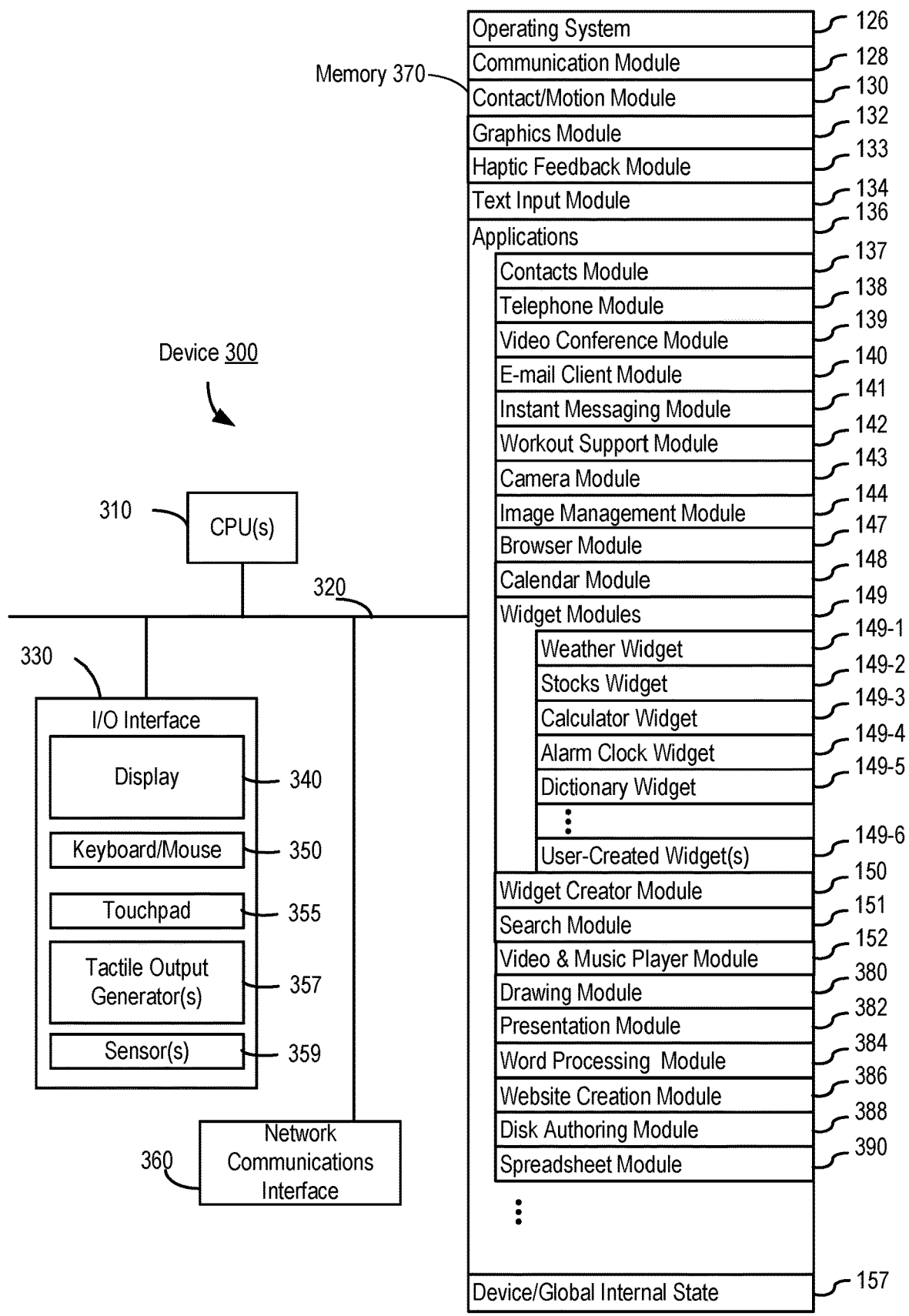
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
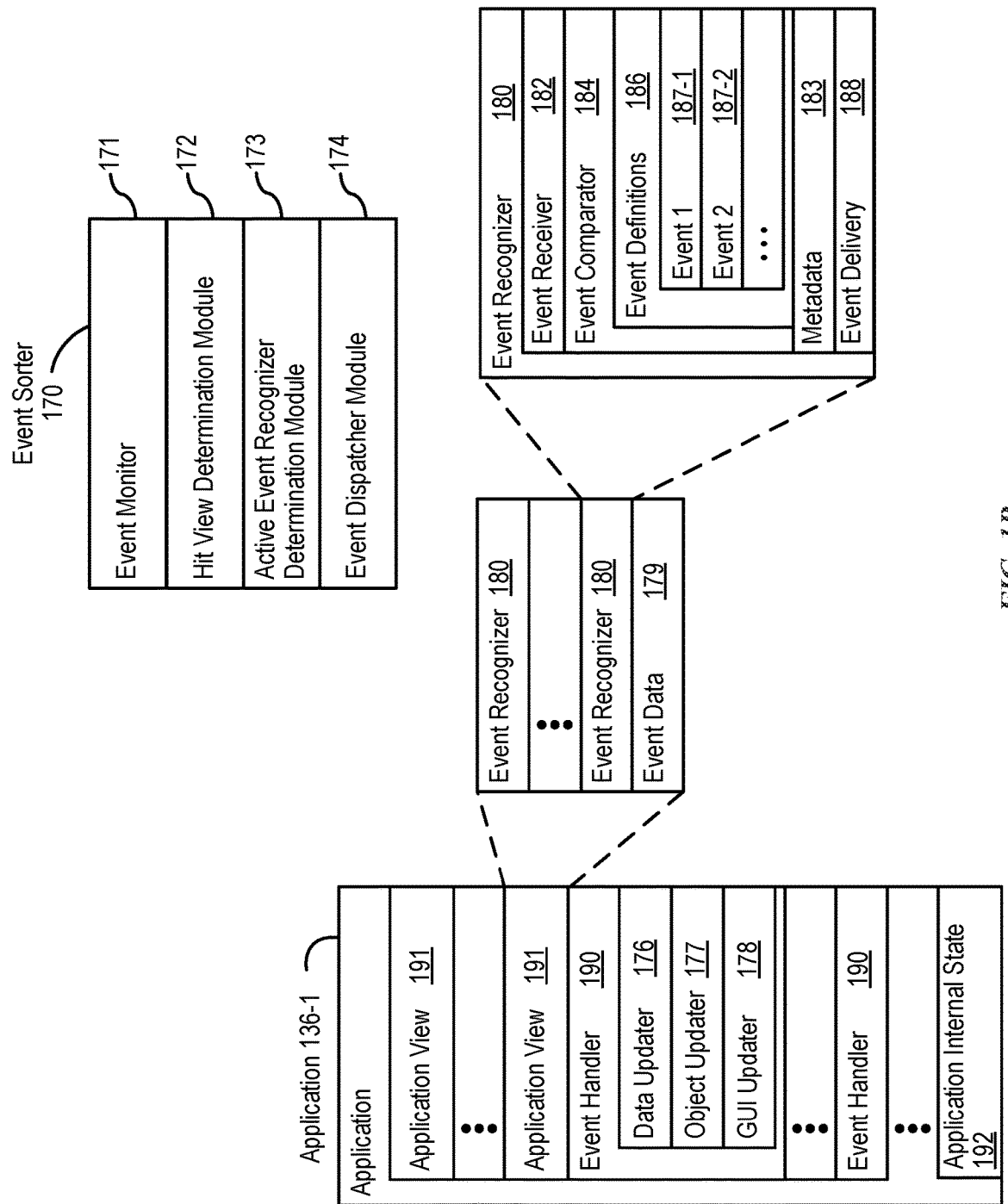
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
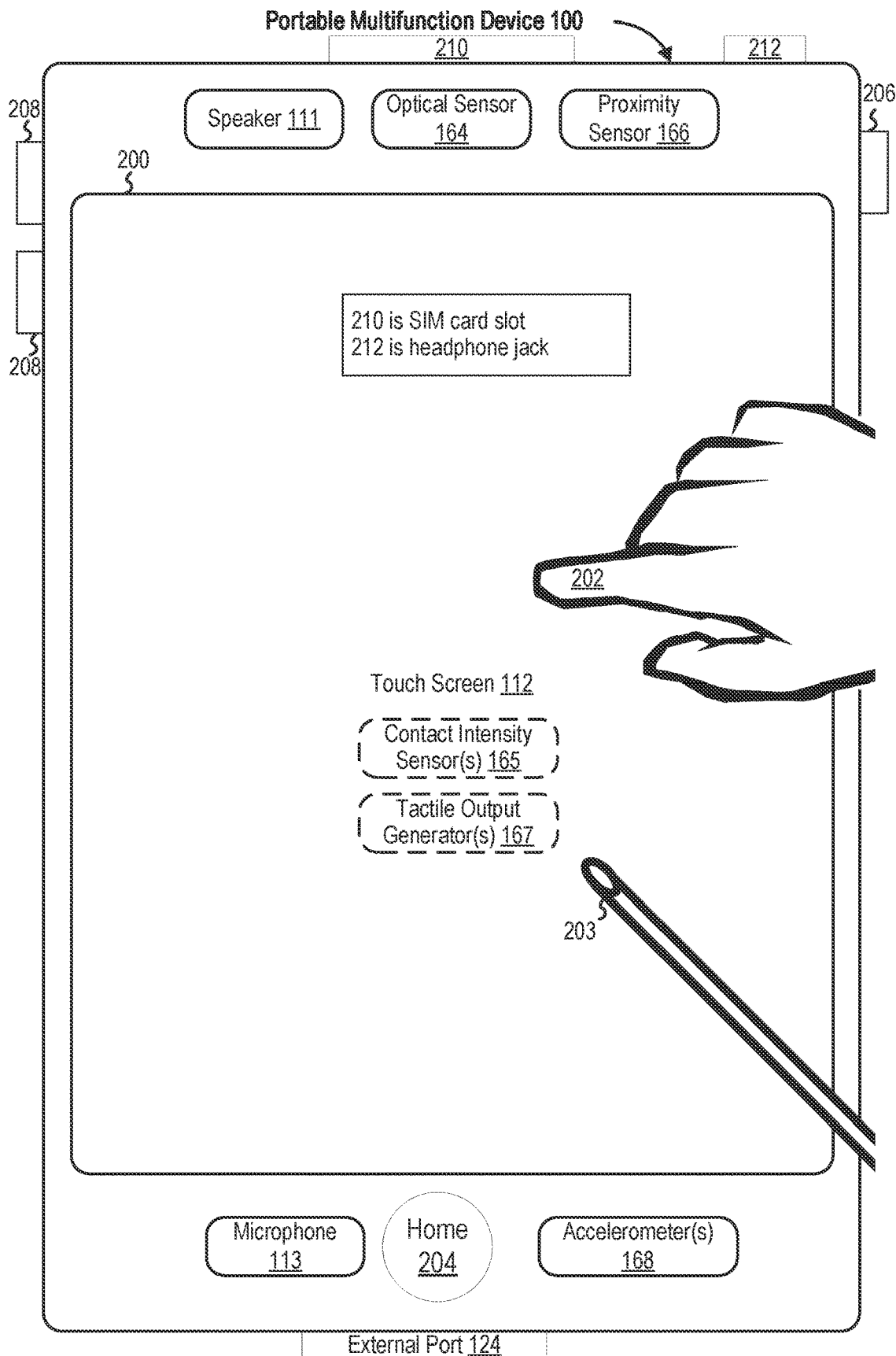
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
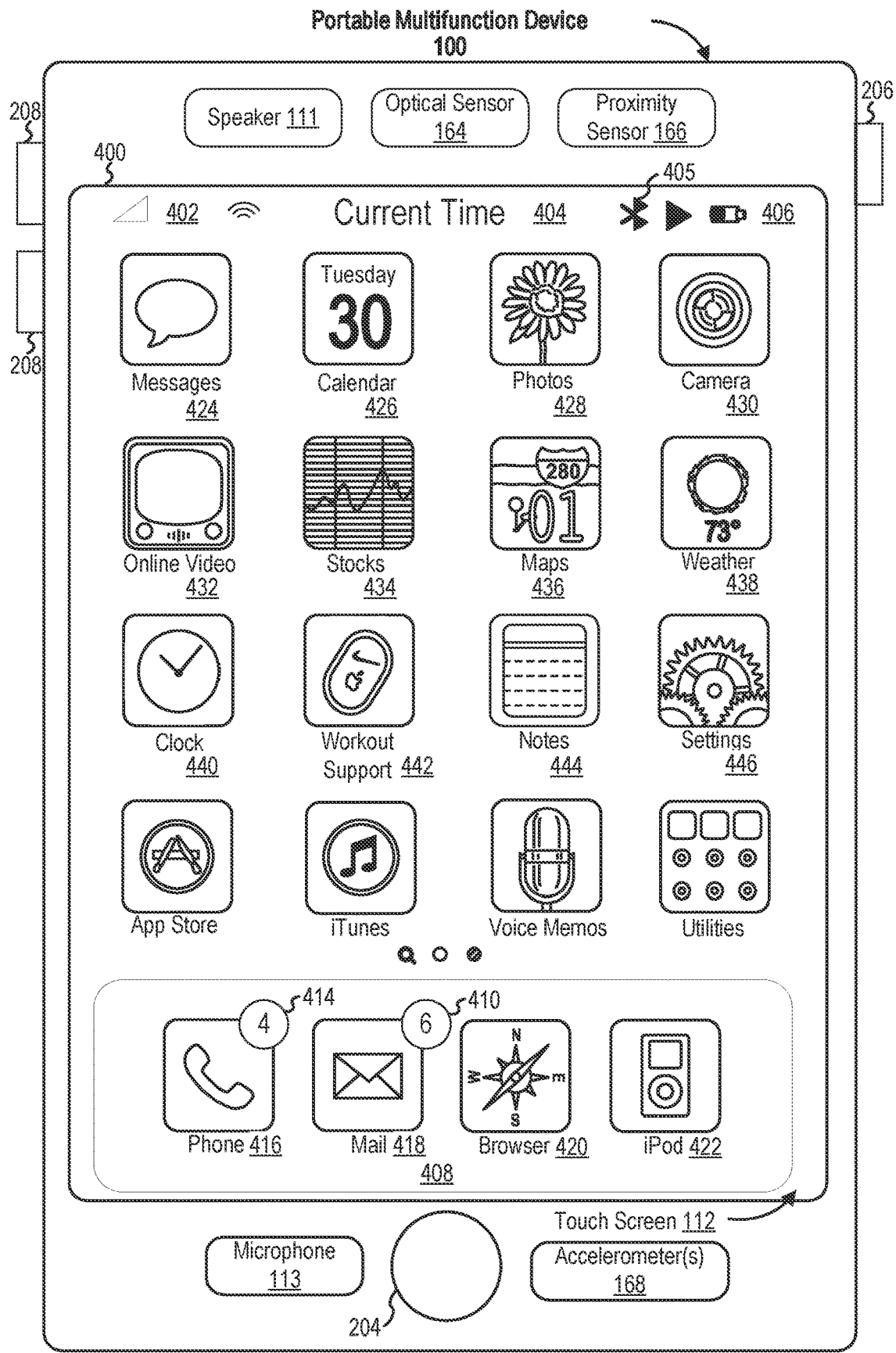
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and
Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
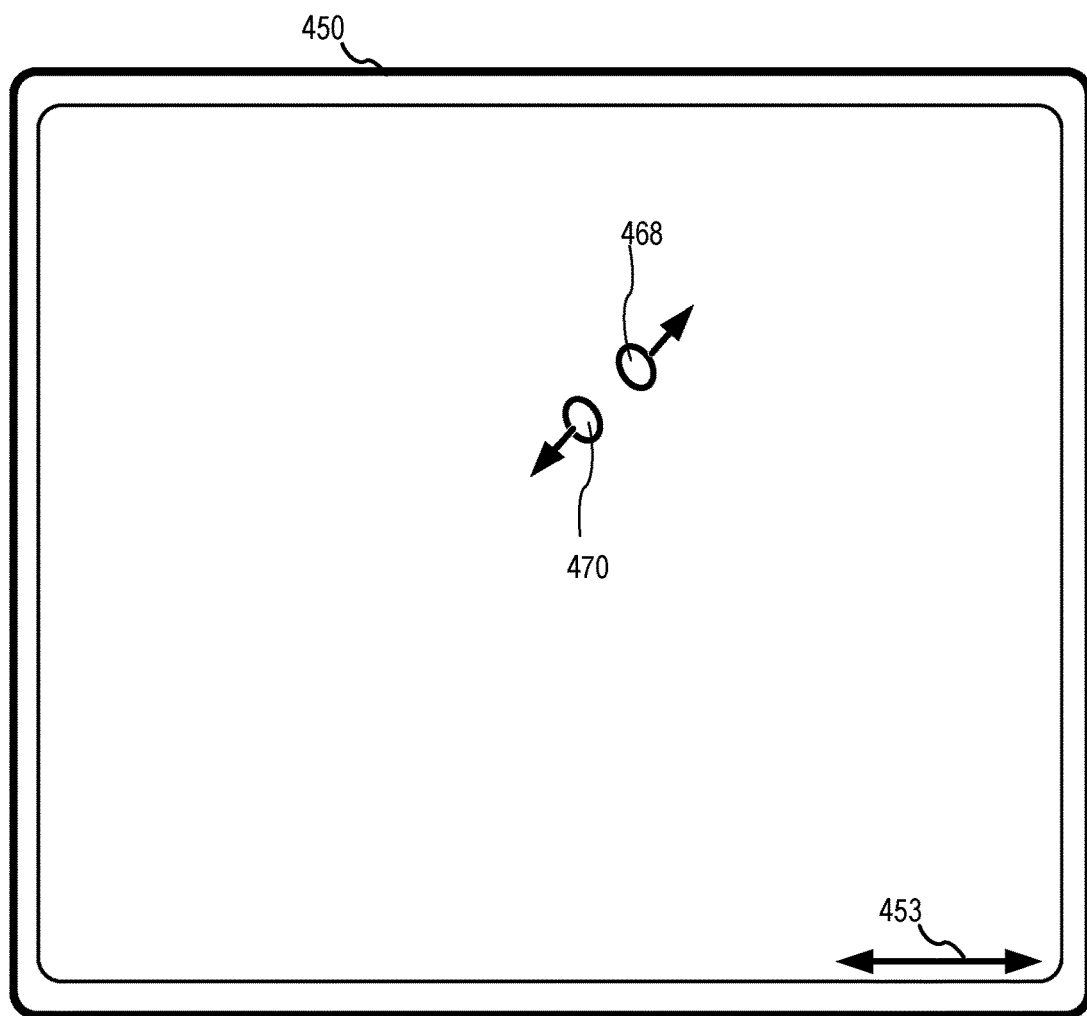
FIG. 4B illustrates an exemplary user interface for a multifunction device with a touch-sensitive surface that is separate from the display in accordance with some embodiments.
Figure 4B:
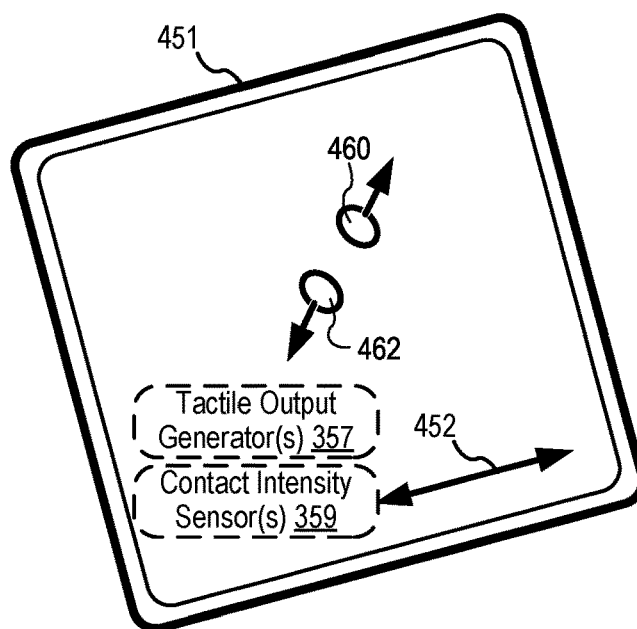

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
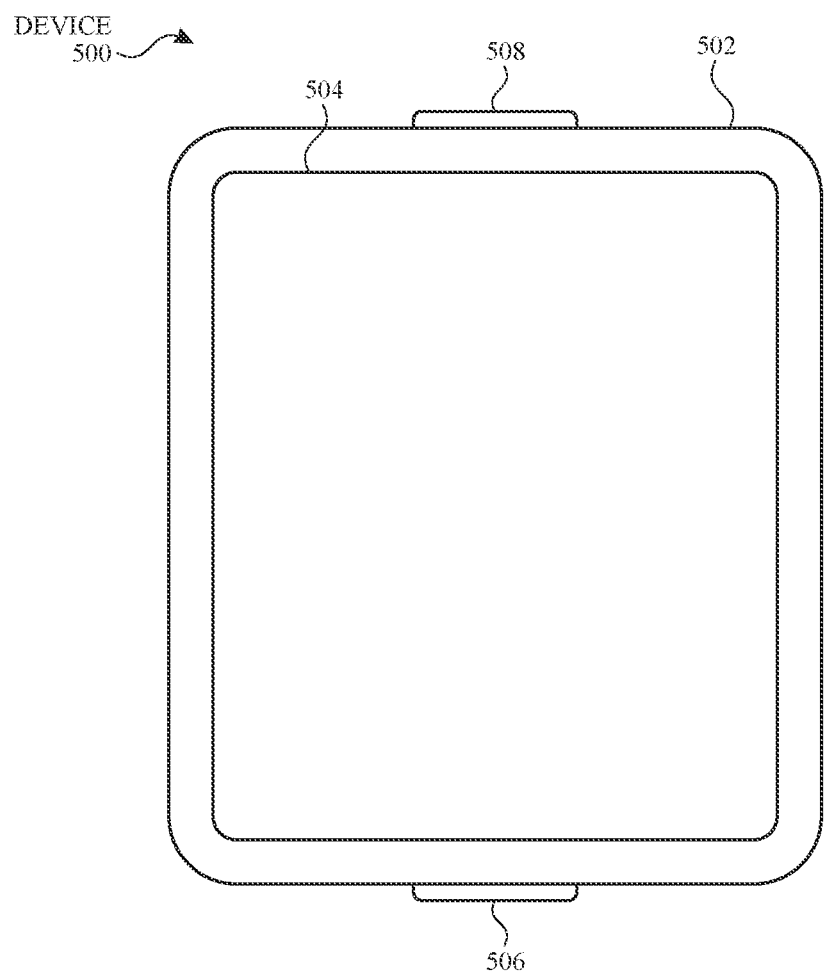
FIG. 5A illustrates a personal electronic device in accordance with some embodiments.
Figures 6A, 6B:
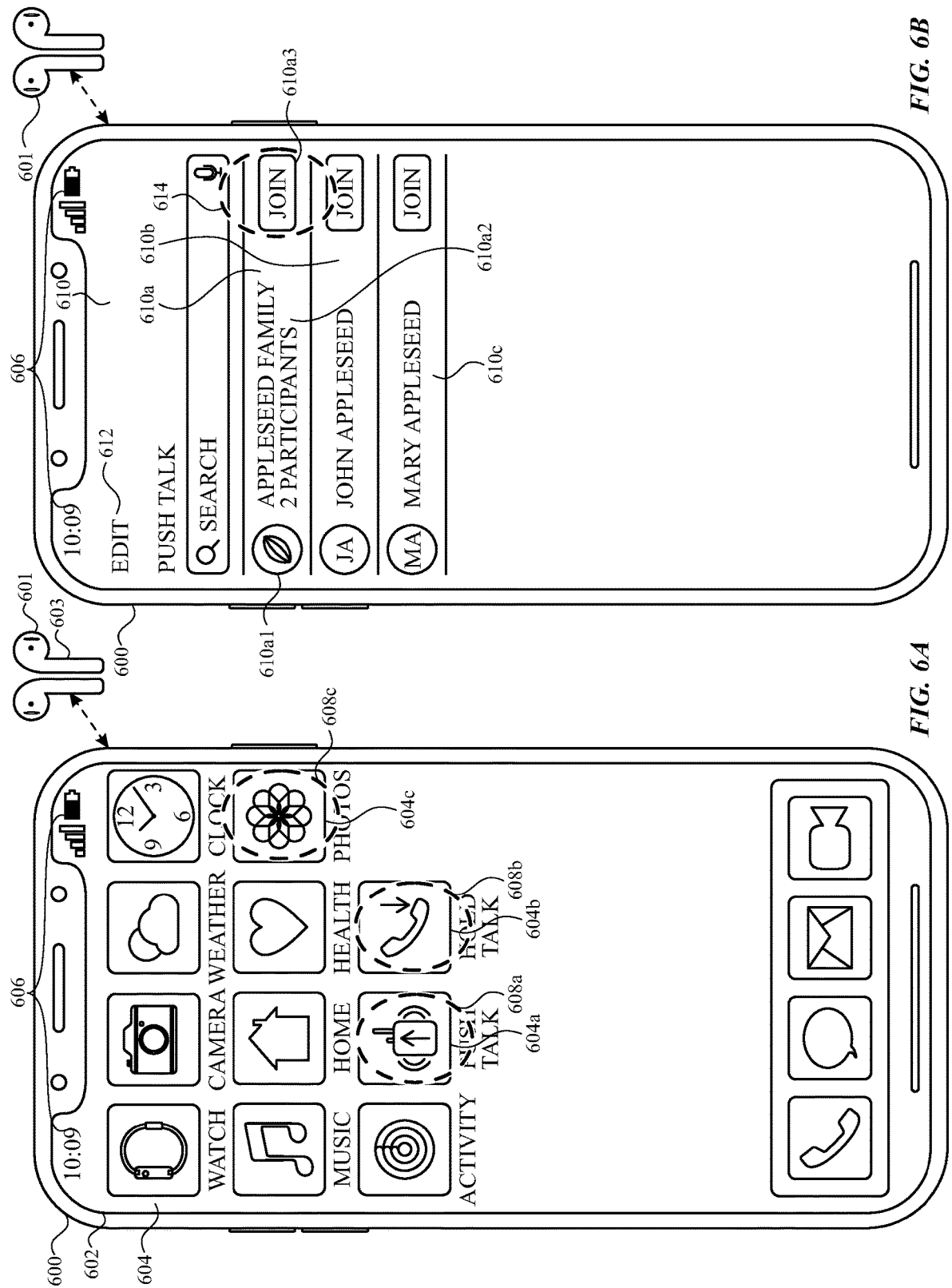
FIGS. 6A-6S illustrate example user interfaces for managing audio channels in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
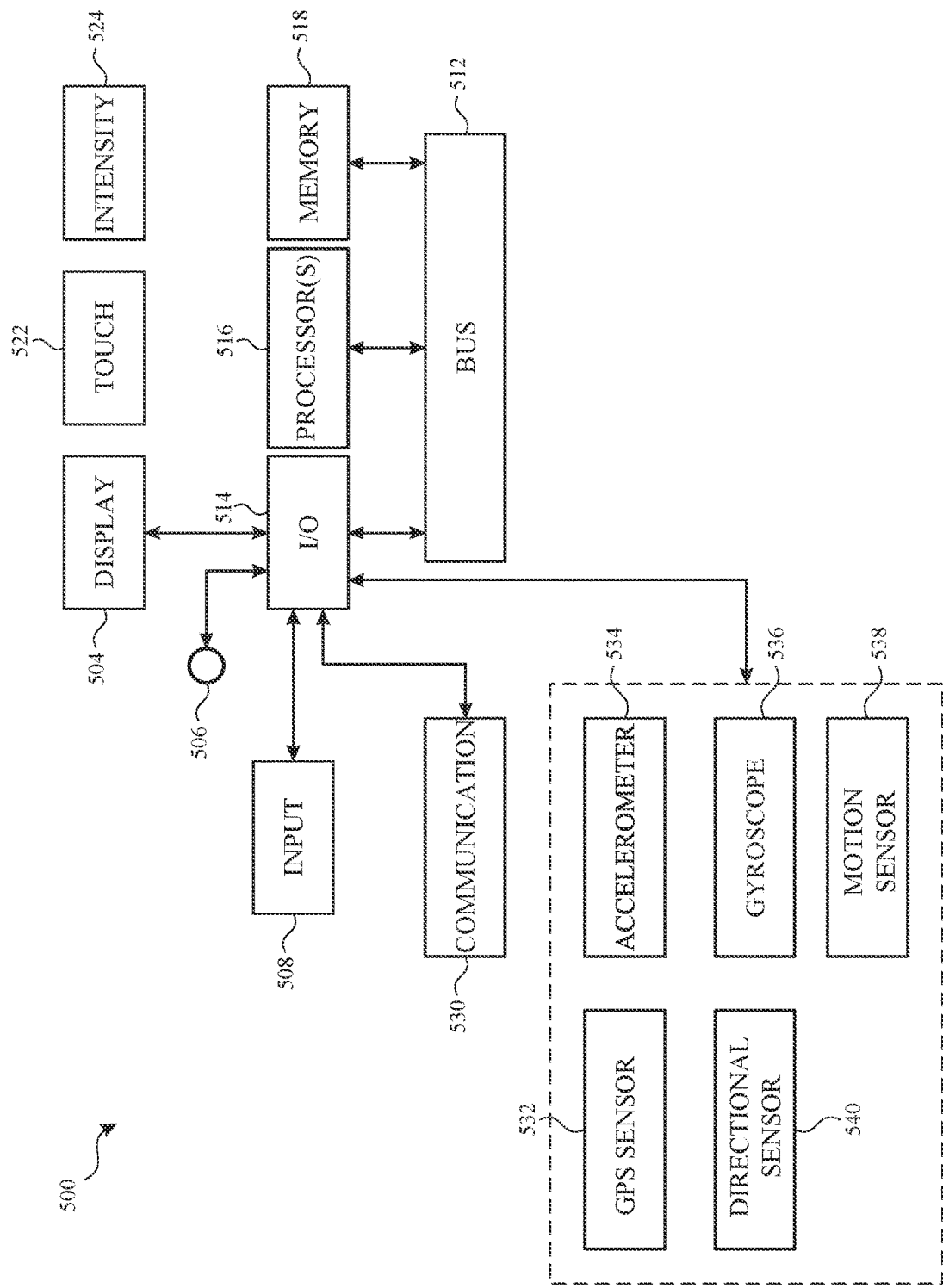
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

In some embodiments, the computer system is in a locked state or an unlocked state. In the locked state, the computer system is powered on and operational but is prevented from performing a predefined set of operations in response to user input. The predefined set of operations optionally includes navigation between user interfaces, activation or deactivation of a predefined set of functions, and activation or deactivation of certain applications. The locked state can be used to prevent unintentional or unauthorized use of some functionality of the computer system or activation or deactivation of some functions on the computer system. In some embodiments, in the unlocked state, the computer system is powered on and operational and is not prevented from performing at least a portion of the predefined set of operations that cannot be performed while in the locked state. When the computer system is in the locked state, the computer system is said to be locked. When the computer system is in the unlocked state, the computer is said to be unlocked. In some embodiments, the computer system in the locked state optionally responds to a limited set of user inputs, including input that corresponds to an attempt to transition the computer system to the unlocked state or input that corresponds to powering the computer system off.

Attention is now directed towards embodiments of user interfaces ("UI") and associated processes that are implemented on an electronic device, such as portable multifunction device 100, device 300, or device 500.

FIGS. 6A-6S illustrate exemplary user interfaces for managing audio channels, in accordance with some embodiments. The user interfaces in these figures are used to illustrate the processes described below, including the processes in FIG. 7.

FIG. 6A illustrates computer system 600, a smart phone, with display 602, which is a touch-sensitive display. In some embodiments, computer system 600 is a tablet, watch, laptop, desktop, a head mounted display ("HMD"), a digital media player, a car head unit (e.g., an infotainment system), and/or a smart speaker. In some embodiments, computer system 600 includes one or more features of device 100, 300, and/or 500. For example, computer system 600 includes RF circuitry 108 for receiving and sending signals wirelessly (e.g., for cellular communication and data transmission). Computer system 600 can use RF circuitry 108 to open one or more wireless communication channels, including audio communication channels (e.g., a discrete audio communication channel or a logical channel of a multiplexed communication link), which are also referred to as audio channels.

In FIG. 6A, computer system 600 is connected to headphones 601, which are capable of outputting audio transmitted to headphones 601 from computer system 600, via one or more integrated speakers. Headphones 601 are also capable of detecting audio via one or more integrated microphones and transmitting that audio to computer system 600 (e.g., for transmission to one or more external devices via an audio communication channel). Headphones 601 also include button 603 for press inputs. In some embodiments, headphones 601 includes one or more touch-sensitive surfaces that can detect touch gestures, such as a tap or tap-and-hold. In FIG. 6A, headphones 601 are neither outputting nor receiving audio, as no audio channels are currently open on computer system 600.

In FIG. 6A, computer system 600 displays home interface 604, which includes affordances for accessing various applications, including push-talk affordance 604a for accessing an audio communication application ("Push Talk"), hold-talk affordance 604b for accessing another audio communication application ("Hold Talk"), and photos affordance 604c for accessing a photos application. In the embodiment of FIGS. 6A-6S, home interface 604 is a user interface of an operating system of computer system 600 and is therefore referred to as a system user interface or system user interface element as it is generated by the operating system, which is system software. In some embodiments, system software is referred to as first party software. In the embodiment of FIGS. 6A-6S, the Push Talk application is provided by a third party developer that is other than the developer of the operating system. In the embodiment of FIGS. 6A-6S, the Hold Talk application is provided by a different third party developer that is other than the developer of the operating system and other than the developer of the Push Talk application. In FIG. 6A, computer system 600 also displays a status region 606 that provides status indications for various functions of computer system 600 (e.g., a navigation guidance function, current time function, and/or an audio and/or visual recording or playback function) and/or for various hardware for computer system 600 (e.g., battery status and/or wireless communication status). In some embodiments, status region 606 is displayed in conjunction with or overlaying multiple other user interfaces, including system user interfaces and application user interfaces (e.g., interfaces of first party and third party applications). In the embodiment of FIGS. 6A-6S, computer system 600 is associated with the user Sarah Appleseed (e.g., an account associated with Sarah Appleseed is currently active on computer system 600).

In some embodiments, the Push Talk and Hold Talk applications that correspond to push-talk affordance 604a and hold-talk affordance 604b, respectively, are push to talk applications, which can also be referred to as PTT applications or press-to-transmit applications. Such applications can be first party or third party applications. In some embodiments, participants can use a push to talk application or method to communicate via an open audio channel that is typically a true or simulated half-duplex audio channel. In some embodiments, a participant can add audio content into the open channel by providing an input (e.g., a button press) as the user speaks or just prior to speaking, hence the term "push to talk" or "press-to-transmit". In some embodiments, the audio channel, when no user is actively transmitting, is open, but otherwise inactive or quiescent; thus a given participant can be described as being muted, until the given participant chooses to provide an input to transmit. In this way, such applications and methods can provide a convenient method for communication with less concerns of overloading the channel with unwanted audio, speaking over another participant or being spoken over, and/or inadvertently transmitting unintended audio. Push to talk applications and methods often find use in certain contexts where such functionality is desirable and can be integrated into or paired with software applications such as online gaming applications, social media applications, video conferencing applications where a user chooses to be muted by default, baby monitor applications, and/or doorbell and/or intercom system applications. In some embodiments, the audio channels opened by push to talk applications and methods can be 1:1 audio channels between two participants or can be multiple other participant channels with 3 or more total participants. In the later scenario, typically only one participant of the group of participants is transmitting audio/speaking at a time, with the others listening and subsequently, speaking (e.g., speaking in turn).

In FIG. 6A, computer system 600 detects touch inputs 608a, 608b, and 608c (e.g., taps) on push-talk affordance 604a, hold-talk affordance 604b, and photos affordance 604c, respectively. The response of computer system 600 to each of the inputs is discussed in more detail, below.

In FIG. 6B, computer system 600 displays, in response to detecting touch input 608a in FIG. 6A, push-talk interface 610, which is a user interface of the Push Talk application. Push-talk interface 610 includes channels 610a-c, which are predefined audio channels that can be opened by the Push Talk application. For example, channel 610a indicates that it is a channel for communicating with other participants collectively identified as "Appleseed Family". Channel 610a includes icon 610a1 that graphically represents Appleseed Family, participant indicator 610b that indicates the other participants in the channel (John Appleseed and Mary Appleseed, as shown in FIG. 6C), and join affordance 610a3 for opening the Appleseed Family audio channel. Channels 610b and 610c include similar elements. Push-talk interface 610 also includes edit affordance 612 that can be selected to cause computer system 600 to display options for creating new audio channels, deleting existing channels, and/or modifying existing channels. Computer system 600 also displays status region 606 in conjunction with push-talk interface 610. In FIG. 6B, computer system 600 detects touch input 614 that corresponds to join affordance 610a3.

In FIG. 6C, in response to input 614, computer system 600 opens an audio channel to allow communication with the other participants of Appleseed Family, John Appleseed and Mary Appleseed, and displays Appleseed Family channel interface 616. Appleseed Family channel interface 616 is generated by the Push Talk application and includes application leave affordance 616a and application talk affordance 616b. Application leave affordance 616a, when selected, causes computer system to close the Appleseed Family channel and to return to push-talk interface 610. Application talk affordance 616b, when selected, causes computer system 600 to transmit captured audio (e.g., captured via the one or more microphones of headphones 601) to the other participants of the Appleseed Family channel. In the embodiments of FIGS. 6A-6S, an audio channel can be open, but not actively transmitting audio from or to computer system 600, until one or more participants take active steps (e.g., selection of an affordance) to cause transmission and subsequent output of audio. Computer system 600 also displays notification 618, a system user interface element, that indicates that an audio channel has been opened. In some embodiments notification 618 is only displayed for a predetermined period of time. In some embodiments, computer system 600 displays a system user interface element when an audio channel is opened (e.g., opened by a third party application) in order to inform the user, in a consistent manner, that a channel has been opened (e.g., in case the third party interface does not provide a clear indication). In FIG. 6C, computer system 600 detects input 620 (e.g., an upwards swipe gesture) that originates near the bottom edge of Appleseed Family channel interface 616.

In FIG. 6D, in response to input 620, computer system 600 redisplays home interface 604. In FIG. 6D, computer system 600 displays indicator 606a (e.g., a blue region around a current time displayed in status region 606), a system user interface element, in the upper corner of display 602 to indicate to the user that an audio channel (e.g., the Appleseed Family channel) is currently open. In some embodiments, a computer system of John Appleseed (e.g., another participant in the audio channel) would show a similar indicator when the audio channel is currently open on the computer system of John Appleseed. In FIG. 6D, computer system 600 detects input 622 (e.g., a tap) on indicator 606a.

Figure 6E:
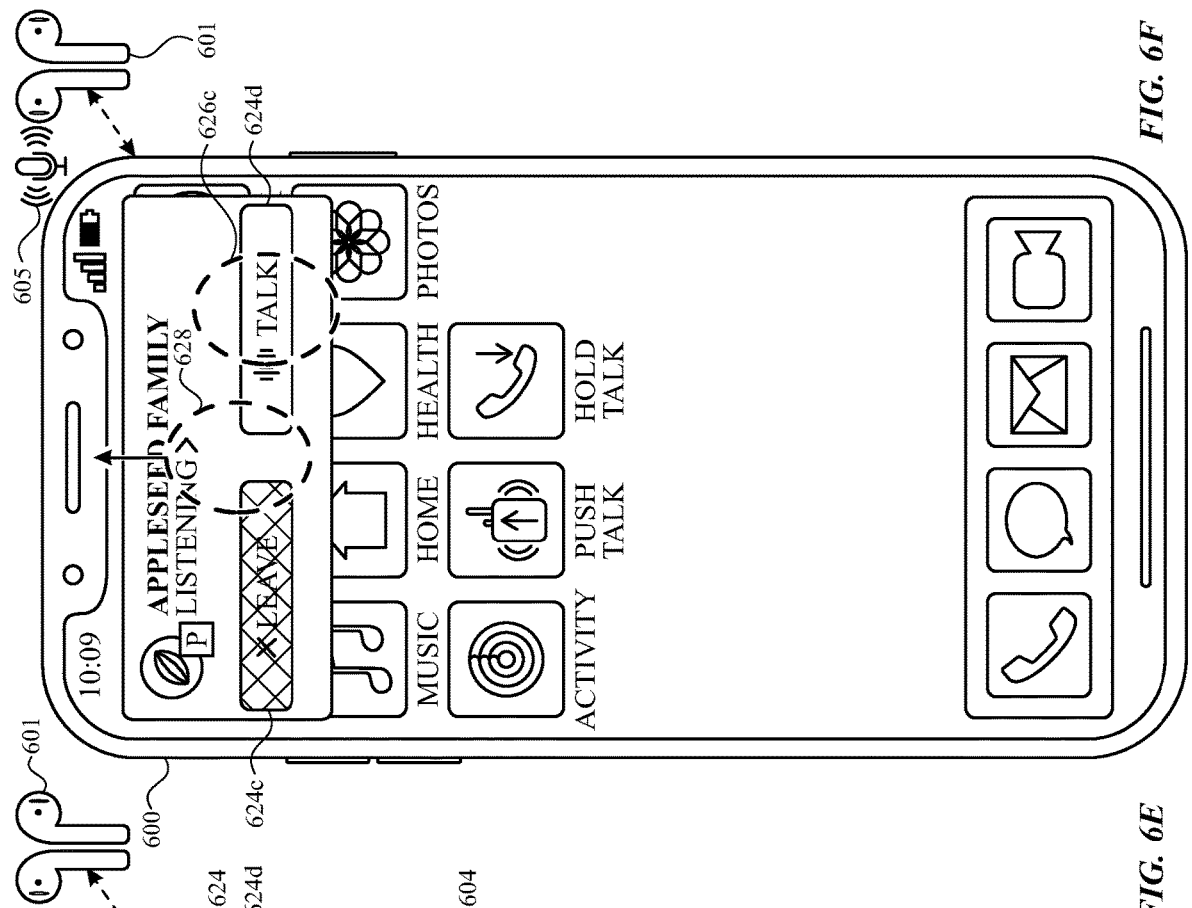
Figure 6F:
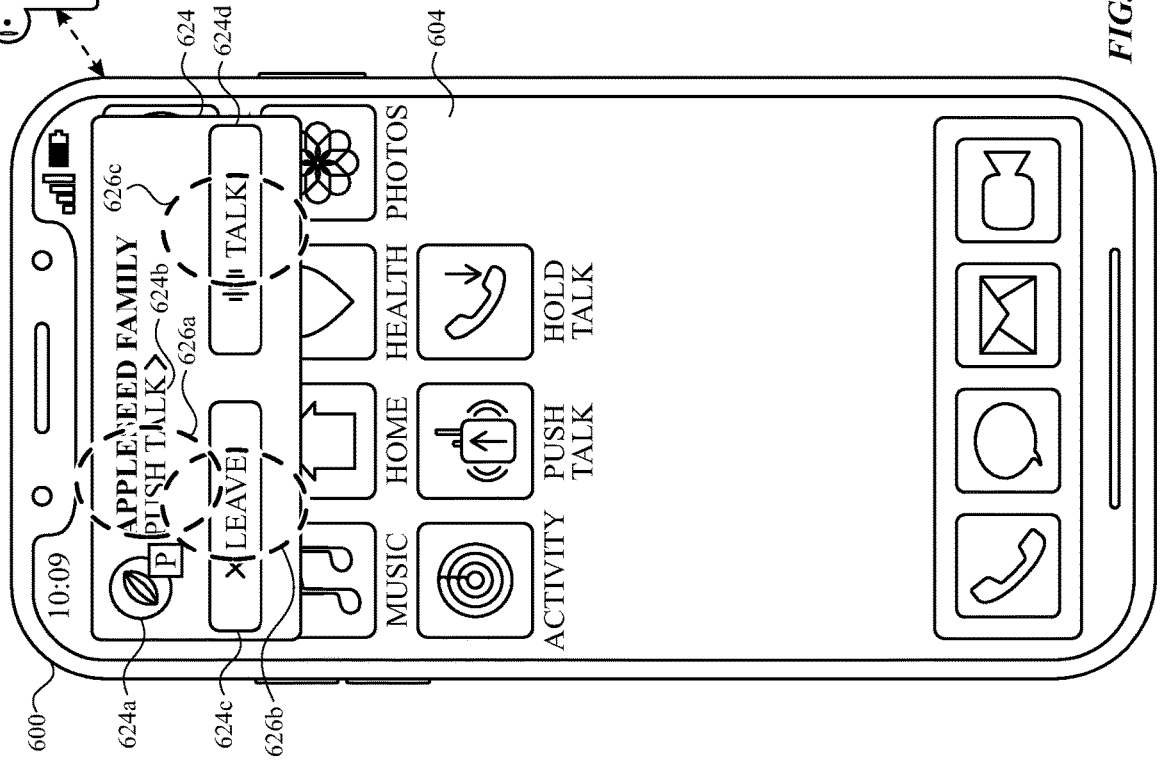

In FIG. 6E, in response to input 622, computer system displays audio channel management interface 624. Audio channel management interface 624 is a system user interface generated by system software, which is different than Appleseed Family channel interface 616 of FIG. 6C, which is generated by the Push Talk application and is not a system user interface, though both interfaces include affordances for managing various functions of the same open audio channel. Audio channel management interface 624 includes icon 624a that resembles icon 610a1 of FIG. 6B and that graphically represents the audio channel and the application that opened the channel (as indicated by the "P" in the icon). In FIG. 6E, computer system 600 detects input 626a, 626b, and 626c. Input 626a corresponds to application affordance 624b that indicates that the channel was opened by the Push Talk application; in response to input 626a, computer system 600 redisplays Appleseed Family channel interface 616 of FIG. 6C. Input 626b corresponds to leave affordance 624c; in response to input 626b, computer system 600 closes the Appleseed Family channel and, in some embodiments, ceases to display audio channel management interface 624. Input 626c corresponds to talk affordance 624d; in response to input 626c, computer system 600 causes detected audio to be transmitted to the other participants of the open Appleseed Family channel, as shown in FIG. 6F. In some embodiments, in response to input 626c, computer system 600 outputs an audio chime/tone and/or a haptic output.

In FIG. 6F, headphones 601 are detecting audio (e.g., speech from a user of computer system 600), as represented by symbol 605, and transmitting that audio to computer system 600. Computer system 600 then transmits the detected audio to participants John Appleseed and Mary Appleseed, who are the other participants in the Appleseed Family channel. In some embodiments, if one or more of the other participants have the corresponding channel open on their device (and or the corresponding application running in the foreground or background), the other participant's device would output audio detected by computer system 600. In FIG. 6F, computer system continues to detect input 626c (e.g., it is a press-and-hold input) and will continue to transmit detected audio until input 626c is no longer detected (e.g., computer system 600 ceases to transmit audio when it detects an end of input 626c). In some embodiments, the audio channel is a half-duplex audio channel that can only either transmit or receive at any given time, and while one participant is transmitting audio, the other participants are receiving audio and cannot transmit audio (e.g., the other participants would see an interface similar to that shown in FIG. 6I, discussed in more detail below). In FIG. 6F, leave affordance 624c is shown with a different visual state (e.g., it is greyed out) to indicate that computer system 600 is currently transmitting audio and to indicate that leave affordance is currently inactive and cannot be selected. In FIG. 6F, computer system 600 detects input 628 (e.g., an upward swipe) that originates on audio channel management interface 624. In response to input 628, computer system 600 ceases to display audio channel management interface 624 and redisplays home user interface 604 as shown in FIG. 6D, including indicator 606a in status region 606, as the Appleseed Family channel remains open.

Figure 6H:
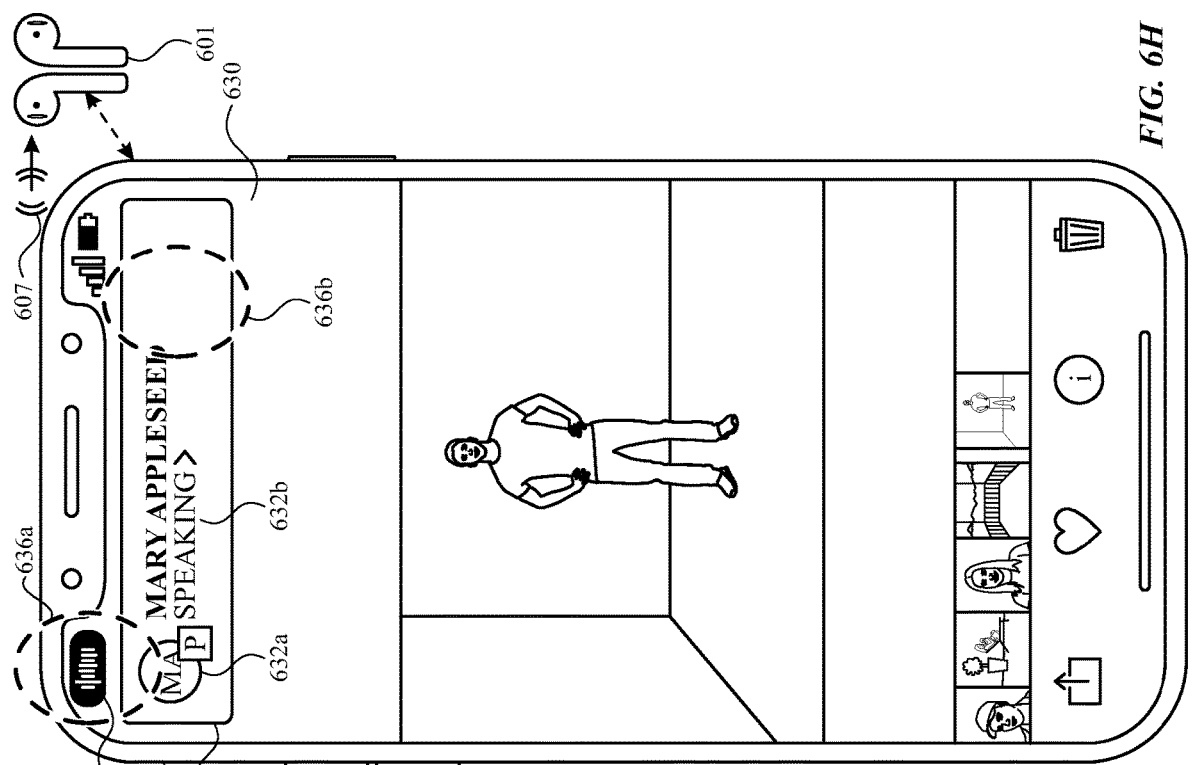
Figure 6G:
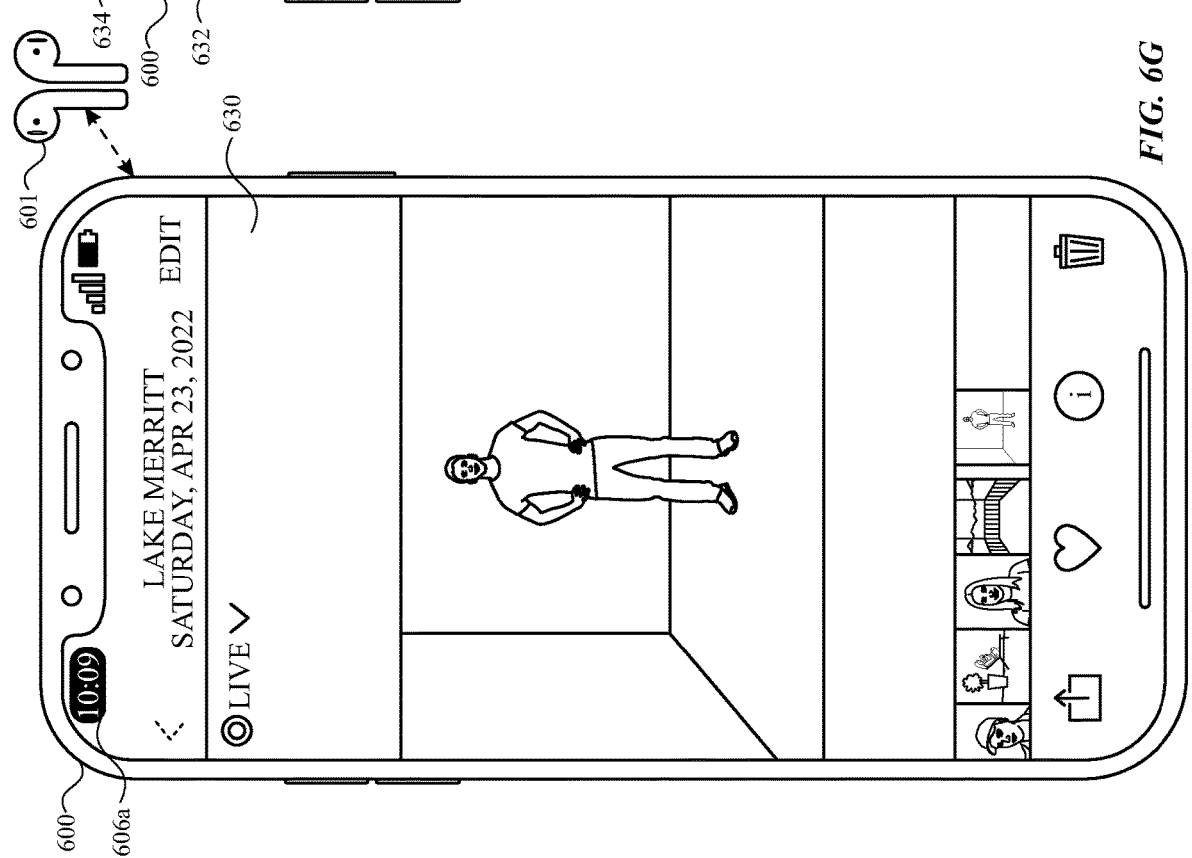

In FIG. 6G, computer system 600 displays photos interface 630, which is an interface that is displayed by computer system 600 after receiving input 608c on photos affordance 604c discussed with reference to FIG. 6A. In FIG. 6G, computer system 600 is displaying photos interface 630 while Appleseed Family channel remains open, as indicated by indicator 606a. In the embodiment of FIGS. 6A-6S, photos interface 630 is an application user interface of an application (e.g., the photos application) that is provided by the same developer as the operating system and can be described as a first party application. In FIG. 6G, while displaying photos interface 630, computer system 600 receives incoming audio data via the open Appleseed Family channel from participant Mary Appleseed. In response to receiving the incoming audio, computer system 600 displays the interface shown in FIG. 6H. In some embodiments, in response to receiving the incoming audio, computer system 600 outputs an audio chime/tone and/or a haptic output.

In FIG. 6H, computer 600 displays notification 632 overlayed on photos interface 630 and also causes audio detected by a computer system of participant Mary Appleseed (e.g., speech) to be outputted via headphones 601, as represented by symbol 607. Notification 632 includes icon 632a that graphically represents Mary Appleseed (e.g., and is similar to the icon for Mary Appleseed in channel 610c of FIG. 6B) and also includes indication 632b that indicates that Mary Appleseed is transmitting audio (e.g., speaking). Computer system 600 also displays indicator 634 in status region 606, which includes an animated waveform (in some embodiments, a waveform that varies based on the received audio) that indicates that an audio channel (e.g., the Appleseed Family channel) is open and receiving audio. Notification 632 and indicator 634 are both system user interface elements that indicate to the user of computer system 600 that audio is being received via an open audio channel. In FIG. 6H, computer system 600 detects input 636a corresponding to indicator 634 and input 636b corresponding to notification 632.

Figure 6I:
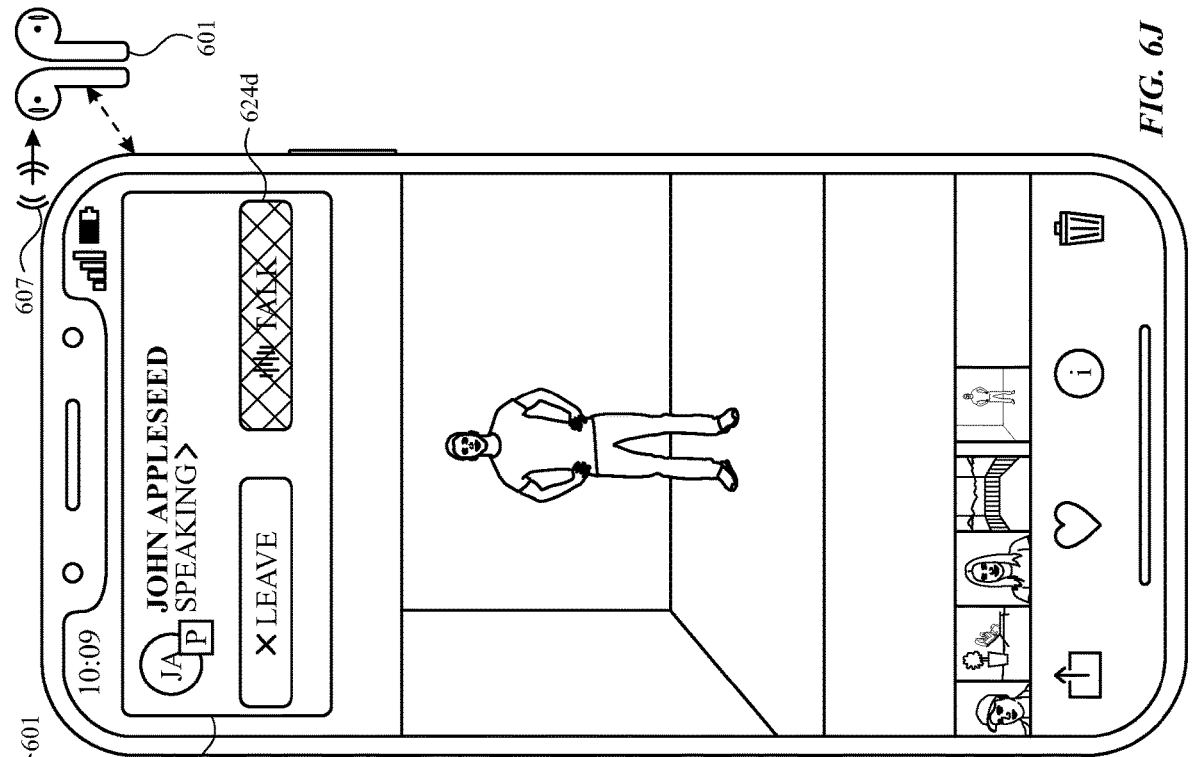

In FIG. 6I, in response to input 636a or input 636b, computer system redisplays audio channel management interface 624, overlaying photos interface 630. Thus, audio channel management interface 624 can be displayed concurrently with both system and application user interfaces and first party or third party user interfaces. In FIG. 6I, computer system 600 continues to output audio from Mary Appleseed, as represented by symbol 607. Talk affordance 624d is displayed with a different visual appearance (e.g., greyed out) than in FIG. 6E to indicate that another participant is transmitting audio and to indicate that talk affordance 624d cannot be currently selected to cause transmission of audio. In contrast, leave affordance 624c remains active and can be selected to cause computer system 600 to close the audio channel and also cease output of audio from the audio channel. In some embodiments, a computer system of another participant of the Appleseed Family channel (e.g., Mary Appleseed) would see an audio channel management interface similar to audio channel management interface 624 of FIG. 6I (indicating that Sarah Appleseed, the user of computer system 600, was speaking), at the time when computer system 600 was transmitting audio as described in FIG. 6F. In FIG. 6I, computer system 600 ceases to receive audio from Mary Appleseed and begins to receive incoming audio data, via the open Appleseed Family channel, from participant John Appleseed. In response, computer system 600 displays the interface shown in FIG. 6J.

Figure 6J:
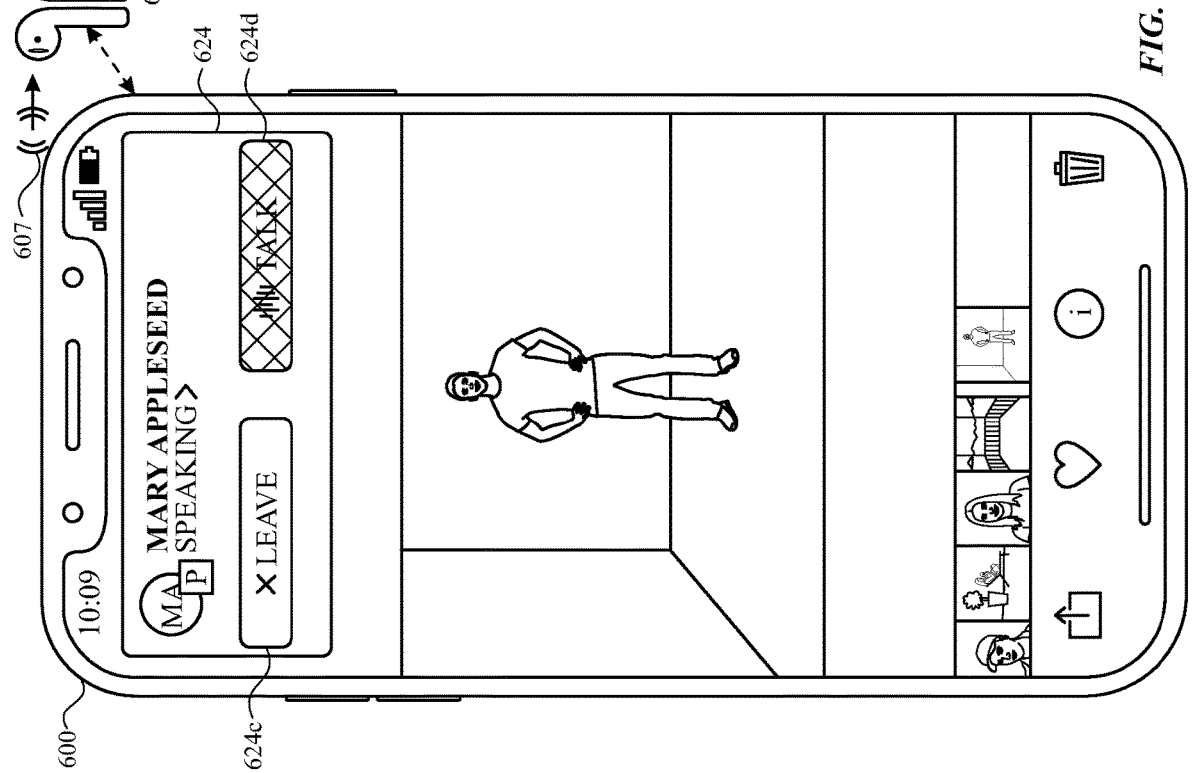
Figure 6S:
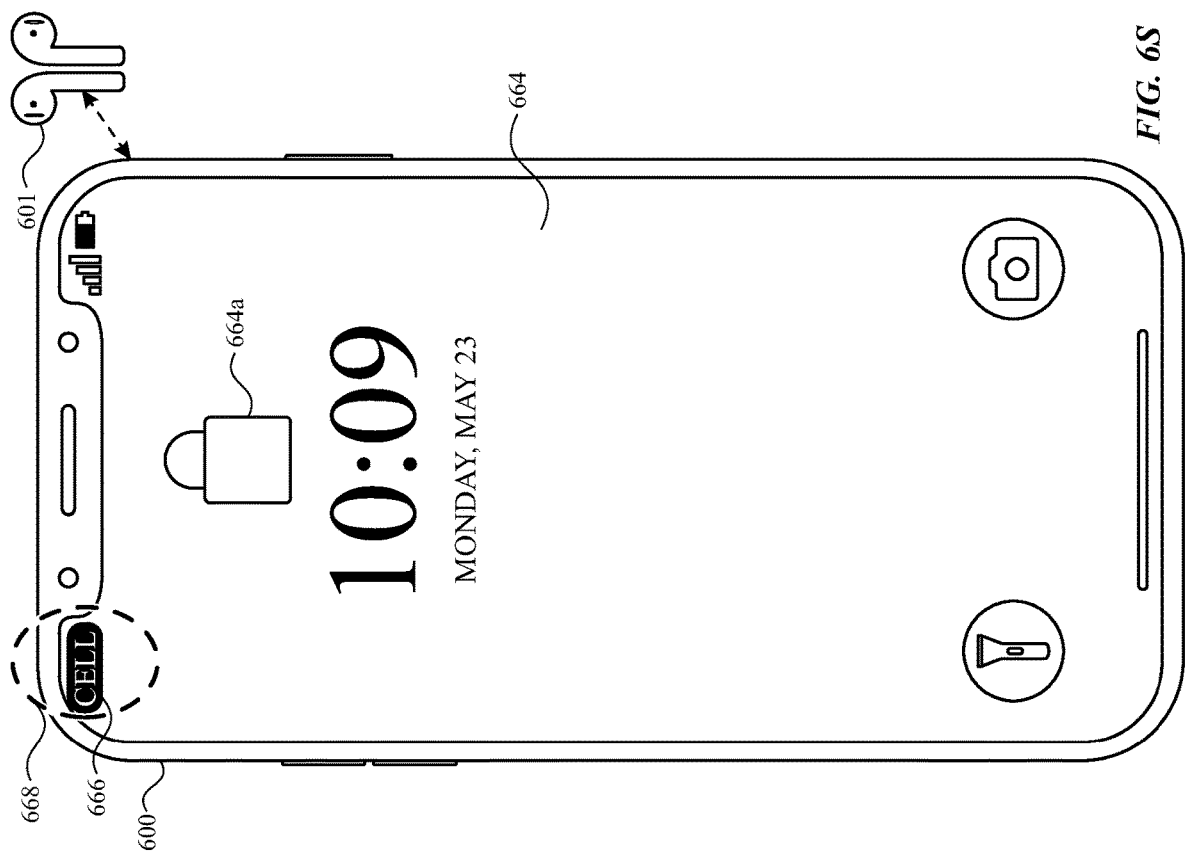

In FIG. 6J, computer system 600 displays audio channel management interface 624 with visual elements that indicate it is now receiving and outputting audio from John Appleseed. Talk affordance 624d continues to be shown in the different visual appearance to indicate that another participant is transmitting and audio and to indicate that the affordance cannot be currently selected to cause transmission of audio.

In FIG. 6K, computer system 600 displays, in response to detecting touch input 608b in FIG. 6A, hold-talk interface 638, which is a user interface of the Hold Talk application, a different application than the Push Talk application, for opening and managing audio channels. In some embodiments, the user of computer system 600 uses the Hold Talk application to communicate with a set of other participants who are available on the Hold Talk application, but not on the Push Talk application. Hold-talk interface 638 includes channels 638a-d, which are predefined audio channels that can be opened by the Hold Talk application. For example, channel 638b indicates that is a channel for communicating with a single other participant, Bob Hold. Channel 638b includes icon 638b1 that graphically represents Bob Hold. Channel 638b is an affordance that can be selected to cause computer system 600 to open an audio channel with Bob Hold. In FIG. 6K, computer system 600 detects input 640 corresponding to channel 638b.

In FIG. 6L, in response to input 640, computer system 600 opens an audio channel to allow communication with Bob Hold and displays Bob Hold channel interface 642. Bob Hold channel interface 642 is generated by the Hold Talk application and includes application leave affordance 642a and application talk affordance 642b. Application leave affordance 642a, when selected, causes computer system to close the Bob Hold channel and to return to hold-talk interface 638. Application talk affordance 642b, when selected, causes computer system 600 to transmit captured audio (e.g., captured via the one or more microphones of headphones 601) to the other participant of the Bob Hold channel. Computer system 600 also displays notification 644, which is a system user interface element, similar to notification 618 of FIG. 6C. In FIG. 6L, computer system 600 detects input 646 (e.g., an upwards swipe gesture) that originates near the bottom edge of Bob Hold channel interface 642. In response to input 646, computer system 600 ceases to display Bob Hold channel interface 642 and displays the interface of FIG. 6D, including indicator 606a in status region 606 to indicate that an audio channel (e.g., the Bob Hold channel) is open.

In FIG. 6M, computer system 600 is showing audio channel management interface 648, which is a system user interface that includes one or more features of audio channel management interface 624, but is configured to manage one or more functions of the Bob Hold channel. For example, audio channel management interface 648 includes icon 648a that resembles icon 638ba1 of FIG. 6K and that graphically represents the audio channel and the application that opened the channel (as indicated by the "H" in the icon). Audio channel management interface 648 also includes application affordance 648b that can be selected to cause redisplay of Bob Hold channel interface 642, leave affordance 648c that can be selected to cause the Bob Hold channel to be closed, and talk affordance 648d that can be selected to cause transmission of detected audio via the open Bob Hold channel. In FIG. 6M, computer system 600 also displays other channel indicator 650 that indicates that another audio channel (e.g., the Apple Family channel) is available to be managed. In some embodiments, the other audio channel is an open audio channel (e.g., multiple channels can be open simultaneously) such that audio from one or more channels can be outputted at the same time, if audio data is received for both channels. In some embodiments, the other channel is a previously open, but now closed, channel and audio from the other channel is not outputted while the channel remains closed. In some embodiments, other channel indicator 650 is not displayed. In FIG. 6M, headphones 601 detect input 609 (e.g., a press) via button 603 and transmits an indication of input 609 to computer system 600. In response to input 609, computer system 600 causes detected audio to be transmitted to the other participants of the open Bob Hold channel, as shown in FIG. 6N.

In FIG. 6N, headphones 601 are detecting audio (e.g., speech from a user of computer system 600), as represented by symbol 605, and transmitting that audio to computer system 600. Computer system 600 then transmits the detected audio to Bob Hold, who is the other participant in the Bob Hold channel. In FIG. 6N, talk affordance 648d of FIG. 6M has been replaced by done affordance 648e. Computer system 600 continues to transmit audio via the Bob Hold channel until further input (e.g., another input via button 603 or an input corresponding to done affordance 648e) is received. In FIG. 6N, computer system 600 detects input 652a (e.g., a tap) corresponding to done affordance 648e and, in response, ceases to transmit audio via the Bob Hold channel but leaves the audio channel open. In FIG. 6N, computer system 600 also detects input 652b (e.g., a rightwards swipe gesture) that originates on audio channel management interface 648.

In FIG. 6O, in response to a first portion of input 652b, computer system 600 displays audio channel management interface 648, corresponding to the Bob Hold channel, partially transitioning offscreen and audio channel management interface 624, corresponding to the Appleseed Family channel, partially transitioning onscreen. In some embodiments where the Appleseed Family channel was not open at the time that input 652b was received, computer system opens the Appleseed Family channel in response to input 652b. In some embodiments, in response to input 652b, computer system 600 closes the Bob Hold channel. In some embodiments, computer system 600 transitions audio channel management interface 648 offscreen, but leaves the Bob Hold channel open.

In FIG. 6P, computer system 600 has completed the transition of audio channel management interface 624 back onscreen and audio channel management interface 624 is once again available to manage one or more functions of the open Appleseed Family channel. Computer system 600 also displays other channel indicator 654 that indicates that another audio channel (e.g., the Bob Hold channel) is available to be managed (e.g., after receiving a leftward swipe on audio channel management interface 624). In FIG. 6P, computer system 600 detects input 658 (e.g., a press) on hardware button 656.

In FIG. 6Q, in response to input 658, computer system 600 deactivates a display layer of display 602, which is now blank. While display 602 is now blank, the Appleseed Family channel remains open (e.g., active to receive incoming audio data).

In FIG. 6R, computer system 600 displays audio channel management interface 660. In some embodiments, audio channel management interface 660 is a wake screen that is a system user interface generated by system software. In some embodiments, audio channel management interface 660 is displayed in response to an input (e.g., actuation of hardware button 656, a touch on display 602, and/or movement of computer system 600 (e.g., that corresponds to a lift gesture)) received at computer system 600 while an audio channel is open and the display layer of display 602 is deactivated. In some embodiments, audio channel management interface 660 is displayed in response to receiving incoming audio, via an open audio channel (e.g., the Appleseed Family channel), while the display layer of display 602 is deactivated. Audio channel management interface 660 includes icon 660a that graphically represents the audio channel and the application that opened the channel (as indicated by the "P" in the icon). Audio channel management interface 660 also includes icon 660b that indicates the application that opened the channel (e.g., the Push Talk application). In some embodiments, icon 660b is an affordance that, when selected, causes computer system to initiate a process to display Appleseed Family channel interface 616 (e.g., as in FIG. 6C). In some embodiments, audio channel management interface 660 is a lock screen and the process to display Appleseed Family channel interface 616 requires successful authentication (e.g., passcode authentication and/or biometric authentication (e.g., fingerprint and/or facial recognition)) before Appleseed Family channel interface 616 is displayed. Audio channel management interface 660 also includes leave affordance 660c that is similar to leave affordance 624c (FIG. 6E) that can be selected to cause the Appleseed Family channel to be closed. Audio channel management interface 660 also includes talk affordance 660d that is similar to talk affordance 624d (FIG. 6E) that can be selected to cause transmission of detected audio via the open Appleseed Family channel. In FIG. 6R, computer system 600 detects input 662 (e.g., an upwards swipe gesture) that originates near the bottom edge of audio channel management interface 660.

In FIG. 6S, in response to input 662, computer system 600 displays lock screen interface 664, which includes lock icon 664a that indicates that computer system 600 is in a locked state, as discussed in more detail, above. Computer system 600 also displays indicator 666 (e.g., blue shading around a cellular service indication in status region 606) that indicates that an audio channel is open. In FIG. 6S, computer system 600 detects input 668 corresponding to indicator 666. In response to input 668, computer system 600 redisplays audio channel management interface 660.

FIG. 7 is a flow diagram illustrating a method for managing an audio channel using a computer system in accordance with some embodiments. Method 700 is performed at a computer system (e.g., 100, 300, 500, and/or 600) that is in communication with a display generation component (e.g., 602) and an input device (e.g., 602, 603, 656). Some operations in method 700 are, optionally, combined, the orders of some operations are, optionally, changed, and some operations are, optionally, omitted.

As described below, method 700 provides an intuitive way for managing audio channels. The method reduces the cognitive burden on a user for managing audio channels, thereby creating a more efficient human-machine interface. For battery-operated computing devices, enabling a user to manage audio channels faster and more efficiently conserves power and increases the time between battery charges.

The computer system performs the following operations while (702) an audio channel (e.g., an audio communication channel formed between the computer system and at least one external device; a logical channel dedicated to transmitting audio within a multiplexed communication link; a channel capable of transmitting audio data (e.g., analog and/or digital audio data); and/or a half-duplex or full-duplex channel) (e.g., 610a, 638b) is open (e.g., is active) to send audio messages (e.g., live and/or recorded audio messages) from the computer system and to receive audio messages at the computer system.

The computer system displays (704), via the display generation component, a system user interface (e.g., 604, 664) that is generated by (e.g., managed by, controlled by) system software (e.g., an interface generated by an operating system (e.g., software that manages basic level access to the hardware of the computer system (e.g., via hardware interrupts)) of the computer system (e.g., not by an application (e.g., a 3rd party and/or later installed application))). In some embodiments, the operating system is a 1st party operating system developed and/or provided by the manufacturer and/or distributor of the computer system.

While displaying the system user interface, the computer system detects (706), via the input device, a first input (e.g., 622, 668) (e.g., a tap and/or mouse click on an affordance; actuation of a hardware button/key (e.g., integrated into the computer system and/or a peripheral device in communication with the computer system); and/or a voice command)).

In response to detecting the first input, the computer system displays (708), via the display generation component, an audio channel management user interface (e.g., 624, 648, 660) that is generated by the system software, wherein the audio channel management user interface includes a first selectable option (e.g., an affordance) (e.g., 624c, 624d, 648c, 648d, 648e, 660c, 660d) that, when selected, causes the computer system to perform a first type of operation associated with the audio channel (e.g., managing (e.g., control, affect, and/or alter) a function and/or characteristic (e.g., whether audio is being transmitted and/or received, participants with access to the channel, closing and/or leaving the channel) of the audio channel).

While displaying the audio channel management user interface, the computer system detects (710) a second input (e.g., 626b, 626c, 652a) directed to the first selectable option.

In response to detecting the second input, the computer system performs (712) a first operation of the first type of operation associated with the audio channel, that includes: in accordance with a determination that the audio channel is being managed by a first application (714) (e.g., Push Talk application of affordance 604a), the first operation of the first type is associated with (e.g., affects one or more processes (e.g., audio channel management processes) of) the first application; and in accordance with a determination that the audio channel is being managed by a second application (e.g., Hold Talk application of affordance 604b) that is different from (and optionally has a different source/developer from the first application) from the first application (716), the first operation of the first type is associated with the second application. In some embodiments, a plurality of applications (e.g., 1st party and or 3rd party applications (e.g., applications developed and/or provided by a party other than the manufacturer and/or distributor of the computer system); a later installed application) can access (in some embodiments, via an application program interface (e.g., integrated into the system software and/or provided by the developer and/or provider of the system software)) the audio channel management user interface to manage open audio channels (e.g., channels other than the currently opened channel; later-opened channels, channels opened by the plurality of applications). In some embodiments, the currently opened channel was opened by an application of the plurality of applications. Providing an audio channel management user interface that is generated by the system software and that can manage operations from different applications provides the user with a consistent user interface and experience for managing audio channel operations for multiple, different applications. Providing a consistent user interface and experience for managing audio channel operations for multiple, different application reduces the number of inputs and interfaces needed to perform operations of different applications and enhances the operability of the device and makes the user-device interface more efficient (e.g., by helping the user to provide proper inputs and reducing user mistakes that can be caused by variations in interface) which, additionally, reduces power usage and improves battery life of the system by enabling the user to use the system more quickly and efficiently.

In some embodiments, the audio channel (e.g., the Appleseed Family channel) is managed by the first application in some embodiments, was opened via an interface of the first application) and after the audio channel is closed and while a second audio channel (e.g., the Bob Hold channel) that is managed by the second application in some embodiments, was opened via an interface of the second application) is open to send audio messages from the computer system and to receive audio messages at the computer system, the computer displays, via the display generation component, the system user interface that is generated by the system software; while displaying the system user interface and while the second audio channel is open, the computer system detects, via the input device, a third input (e.g., a tap and/or mouse click on an affordance; actuation of a hardware button/key (e.g., integrated into the computer system and/or a peripheral device in communication with the computer system); and/or a voice command) (e.g., selection of 606a while the Bob Hold channel is open); in response to detecting the third input, the computer system displays, via the display generation component, the audio channel management user interface that is generated by the system software and that includes the first selectable option in some embodiments, the audio channel management user interface is displayed at the same location on the display when managing audio channels of the first or second applications); while the second audio channel is open, the computer system detects, via the input device, a fourth input (e.g., 626b, 626c, 652a) directed to the first selectable option; and in response to detecting fourth input, the computer system performs a second operation of the first type of operation associated with the audio channel, wherein the second operation of the first type is associated with the second application in some embodiments, and not with the first application). Managing both the (first) audio channel and the second audio channel with the same audio channel management user interface that is generated by the system software provides the user with a consistent user interface and experience for managing audio channel operations for multiple, different applications.

In some embodiments, the system user interface is a wake screen (e.g., 660) of the computer system that is displayed upon reactivation of the display generation component from an inactive state (a partial or complete inactive display state). In some embodiments, the wake screen is also a lock screen which requires successful authentication (e.g., passcode and/or biometric authentication (e.g., fingerprint or facial recognition)) in order to bypass and/or to access one or more locked functions of the system. Providing an audio channel management user interface that is accessible from a wake screen provides the user, via a minimum number of inputs and interfaces, with rapid and efficient access to a consistent user interface and experience for managing audio channel operations for multiple, different applications.

In some embodiments, the system user interface is a primary screen (e.g., a home screen, a main screen, or a root screen) (e.g., 604) of an operating system in some embodiments, the operating system and the system software are the same) of the computer system (a partial or complete inactive display state). In some embodiments, the primary screen is also a lock screen which requires successful authentication (e.g., passcode and/or biometric authentication (e.g., fingerprint or facial recognition)) in order to bypass and/or to access one or more locked functions of the system. In some embodiments, the primary screen is application launching springboard that includes a plurality of application launch icons in some embodiments, icons for the first and second applications). Providing an audio channel management user interface that is accessible from a primary screen provides the user with efficient access from a main and or commonly displayed interface to a consistent user interface and experience for managing audio channel operations for multiple, different applications.

In some embodiments, displaying the audio channel management user interface that is generated by the system software includes replacing display (e.g., ceasing to display the system user interface) of the system user interface with display of the audio channel management user interface (e.g., as seen in FIGS. 6S and 6R in response to input 668). Replacing display of the system user interface with the management user interface de-clutters the user interface and potentially removes affordances that are not relevant to present operation of managing the audio channel, which enhances the operability of the system and makes the user-device interface more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, displaying the audio channel management user interface that is generated by the system software includes maintaining display of at least a portion of the system user interface (e.g., as seen FIGS. 6D and 6E in response to input 622). In some embodiments, the audio channel management user interface overlaps a second portion of the system user interface. Maintaining display of at least a portion of the system user interface when displaying the audio channel management user interface provides the user with an indication of at least the portion of the system user interface that continues to be displayed, which provides improved visual feedback.

In some embodiments, the audio channel management user interface includes a second selectable option (e.g., 624c, 624d, 648c, 648d, 648e, 660c, 660d) that, when selected, causes the computer system to perform a second type of operation associated with the audio channel (e.g., managing (e.g., control, affect, and/or alter) a function and/or characteristic (e.g., whether audio is being transmitted and/or received, participants with access to the channel, closing and/or leaving the channel) of the audio channel) that is different from the first type of operation. In such embodiments, the method further comprises: while displaying the audio channel management user interface, detecting a fifth input (e.g., a tap and/or mouse click on an affordance; actuation of a hardware button/key (e.g., integrated into the computer system and/or a peripheral device in communication with the computer system); and/or a voice command) (e.g., 626b, 626c, 652a) directed to the second selectable option; and in response to detecting the fifth input, performing a first operation of the second type of operation associated with the audio channel, including: in accordance with a determination that the audio channel is being managed by the first application, the first operation of the second type is associated with (e.g., affects one or more processes (e.g., audio channel management processes) of) the first application; and in accordance with a determination that the audio channel is being managed by the second application, the first operation of the second type is associated with the second application. Providing an audio channel management user interface that is generated by the system software and that can manage multiple, different operations from different applications provides the user with a consistent user interface and experience for managing different audio channel operations for multiple, different applications.

In some embodiments, the first type of operation associated with the audio channel includes displaying (e.g., navigating to) an application user interface of an application that manages the audio channel (e.g., the first application or the second application) (e.g., as discussed in response to input 626a).

In some embodiments, the first type of operation associated with the audio channel includes sending one or more audio messages (e.g., adding audio/audio data to the open channel) in some embodiments, configuring the computer system to send one or more messages) from the computer system via the audio channel (e.g., as discussed in response to input 626c and input 609). In some embodiments, the audio message is audio data captured via a microphone that is in communication with the computer system. In some embodiments, the audio message is detected speech. In some embodiments, the audio channel is a half-duplex audio channel and sending one or more audio messages includes configuring the audio channel to a transmission mode (in contrast to a reception mode).

In some embodiments, the second input is selected from the group consisting of: an input of a first type (e.g., a button press, a tap gesture (e.g., a detected contact followed by cessation of the contact within a predetermined period of time (e.g., without movement of the contact)), wherein the audio channel sends one or more audio messages from the computer system (e.g., stays in a transmission mode; continues to transmit audio via a microphone that is in communication with the computer system) until a further input (e.g., that is the same or different than the input of the first type (e.g., a tap and/or mouse click on an affordance; actuation of a hardware button/key (e.g., integrated into the computer system and/or a peripheral device in communication with the computer system); and/or a voice command) is received (e.g., as discussed in response to input 609); and an input of a second type (e.g., a press-and-hold (e.g., of a hardware or software button)), different than the first type, that is sustained for a first period of time, wherein the audio channel sends one or more audio messages from the computer system while the input of the second type is sustained (e.g., as discussed in response to input 626c). In some embodiments, the computer system ceases to send one or more audio messages (e.g., transitions away from a send/transmission mode) when the input of the second type is no longer detected.

In some embodiments, while outputting audio message(s) received via the audio channel, the first selectable option that manages sending one or more audio messages from the computer system via the audio channel is disabled (e.g., is not displayed and/or is not selectable) (e.g., 624c of FIG. 6F).

In some embodiments, in response to detecting the second input in some embodiments, while sending one or more audio messages from the computer system via the audio channel), the computer system displays (e.g., in the audio channel management user interface), via the display generation component, a first visual indication (e.g., "listening", "sending", and/or "transmitting") (e.g., as seen in 6F) that the computer system is sending one or more audio messages (e.g., that audio detected via a microphone that is in communication with the computer system is being sent via the audio channel) via the audio channel. In some embodiments, once the computer system ceases to send one or more audio messages (e.g., transitions to a receive mode), the computer system ceases to display the first visual indication. Displaying a visual indication that the computer system is sending one or more audio messages via the audio channel provides the user with improved visual feedback as to the status of the audio channel. Doing so also reduces the risk that unintended audio messages will be sent, which improves security. Doing so also helps to ensure that transient audio events are not inadvertently not sent. All of this enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second input is received at an external device (e.g., a Bluetooth microphone button, a wired microphone button, a headphone button, car audio controls) (e.g., 601) that is in communication (e.g., wired or wireless) with the computer system (e.g., the device transmits an indication that the input was received, which is detected by the computer system).

In some embodiments, after in some embodiments, in response to) detecting the second input that was received at the external device, the computer system displays, via the display generation component and in the audio channel management user interface, a third selectable option (e.g., 648e) that, when selected, causes the computer system to cease sending one or more audio messages from the computer system via the audio channel. In some embodiments, transitioning from a transmission mode to a reception mode; In some embodiments, once sending of audio starts, audio detected via a microphone that is in communication with the computer system continues to be sent via the audio channel until the third selectable option is selected; In some embodiments, ceasing to detect audio via a microphone that is in communication with the computer system. Providing a selectable option to cease sending audio via the audio channel provides the user with an explicit option to end sending audio, which improves security by reducing the risk that unintended audio messages will be sent and also provides an option for ending audio transmission, if the external device becomes disconnected and/or malfunctions.

In some embodiments, the first type of operation associated with the audio channel includes ceasing sending one or more audio messages (e.g., while the computer system is actively sending audio via the audio channel) from the computer system via the audio channel (e.g., as discussed in response to input 652a). In some embodiments, transitioning from a transmission mode to a reception mode; In some embodiments, once sending of audio starts, audio detected via a microphone that is in communication with the computer system continues to be sent via the audio channel until the third selectable option is selected; In some embodiments, ceasing to detect audio via a microphone that is in communication with the computer system. Providing a selectable option to cease sending audio via the audio channel provides the user with an explicit option to end sending audio, which improves security by reducing the risk that unintended audio messages will be sent and also provides an option for ending audio transmission, if the external device becomes disconnected and/or malfunctions.

In some embodiments, the audio channel management user interface includes a fourth selectable option (e.g., 624c, 648c, 660c) that, when selected, causes the computer system to close (e.g., end, disable, or terminate) the audio channel. In some embodiments, providing an option to close the audio channel that, when used, prevents audio messages from being sent or received via the audio channel while the device is in a suspended and/or locked state or when the application managing the audio channel is a background application. Providing a selectable option to close the audio channel provides the user with an explicit option to close the channel, which improves security by reducing the risk that unintended audio messages will be sent.

In some embodiments, the fourth selectable option is disabled (e.g., is not displayed and/or cannot be selected) while the computer system is sending one or more messages via the audio channel (e.g., 624c as shown in FIG. 6F).

In some embodiments, the audio channel is being managed by the first application, the method further comprising: while displaying the audio channel management user interface with the fourth selectable option, detecting a sixth input (e.g., 626a) that corresponds to a request to display a user interface of the first application; and in response to detecting the sixth input, displaying, via the display generation component, the user interface of the first application, wherein the user interface of the first application includes a seventh selectable option in some embodiments, the seventh selectable option is the same as the sixth selectable option and/or has the same visual appearance as the sixth selectable option) (e.g., 616a) that, when selected, causes the computer system to close the audio channel. In some embodiments, displaying the user interface of the first application includes ceasing to display the audio channel management user interface. Displaying selectable options to close the application in both the audio channel management user interface and the user interface of the first application provides the user with an explicit option to close the channel, which improves security by reducing the risk that unintended audio messages will be sent.

In some embodiments, the computer system is in communication with an audio output device (e.g., a speaker; wired or wireless headphones) (e.g., 601) further comprising: while the audio channel is open to send audio messages from the computer system and to receive audio messages at the computer system, receiving, via the audio channel, a first audio message (e.g., data corresponding to audio recorded at an external device that is connected to the audio channel) (e.g., a transmission as shown in FIGS. 6H and 6I); and in response to receiving the first audio message, outputting, via the audio output device, the first audio message (e.g., as represented by symbol 607).

In some embodiments, outputting the first audio message includes displaying a second visual indication (e.g., a graphical and/or textual indication) (e.g., 632a) of a source of the first audio message (e.g., a user name; a user account; an avatar; and/or an external device name). Displaying a visual indication of a source of an audio message provides the user with improved visual feedback as to the source of the message, including which users/devices and/or audio channels are the source of the message.

In some embodiments, after outputting the first audio message and while the audio channel is open to send audio messages from the computer system and to receive audio messages at the computer system, receiving, via the audio channel, a second audio message in some embodiments, the second audio message is received from the same source external device as the first audio message; In some embodiments, the second audio message is received from a different source external device (e.g., the audio channel is connected to a plurality of other devices) (e.g., transmission as shown in FIG. 6J); and in response to receiving the second audio message, outputting, via the audio output device, the second audio message (e.g., 607 in FIG. 6J).

In some embodiments, the first input is an input corresponding to an eighth selectable option (e.g., 606a) that is displayed in a status region (e.g., a region that displays the status of one or more functions and our hardware devices of the computer system (e.g., battery status, time, connection status, microphone status, camera status)) (e.g., 606) of the system user interface. Displaying a selectable option that causes display of the audio channel management user interface in a status region of the system user interface provides the user with access to the audio channel management user interface without cluttering the UI with additional displayed controls. In some embodiments, the eighth selectable option is displayed in an upper corner of the display generation component.

In some embodiments, the eighth selectable option includes a third visual indication (e.g., 634) that indicates a current status of activity (e.g., whether the channel is transmitting/sending audio, receiving/outputting audio, and/or idle) of the audio channel. Displaying an indication of the current activity status of the audio channel provides the user with improved visual feedback as to the status of the audio channel.

In some embodiments, the status region includes a fourth visual indication (e.g., additional indicators in status region 606, as shown in FIG. 6B) that indicates a current status selected from the group consisting of battery status, current time, connection (e.g., Wi-Fi, Bluetooth, cellular, and/or VOIP) status, microphone status, camera status, navigation (e.g., map) status, and a combination thereof. Displaying an indication of the current status of one or more functions and/or hardware devices of the computer system provides the user with improved visual feedback as to the one or more statuses.

In some embodiments, while the audio channel is open and a third audio channel is inactive (e.g., not open, in a suspended state), the computer system receives a seventh input (652b) that corresponds to a request to switch audio channels; and in response to the seventh input: opens the third audio channel; and inactivates the audio channel (e.g., as shown in FIGS. 6N-6P).

In some embodiments, in response to the seventh input, the computer system: ceases to display the audio channel management user interface (e.g., ceases to display 648 as shown in FIG. 6P); and displays a second audio channel management user interface (e.g., 624 of FIG. 6P) that is generated by the system software and that includes a ninth selectable option (e.g., an affordance) (e.g., 624c, 624d) that, when selected, causes the computer system to perform a third type of operation associated with the third audio channel (e.g., managing (e.g., control, affect, and/or alter) a function and/or characteristic (e.g., whether audio is being transmitted and/or received, participants with access to the channel, closing and/or leaving the channel) of the third audio channel). In some embodiments, in response to the seventh input, displaying an animation of the audio management user interface transitioning/sliding off the display and the second audio management user interface transitioning/sliding onto the display. Replacing the audio channel management user interface with the second audio channel management user interface provides the user with a management interface for a currently open channel without cluttering the UI with additional displayed controls for the channel that is inactive.

In some embodiments, the audio channel is managed by the first application (e.g., Hold Talk application), and the third audio channel is managed by the second application (e.g., Push Talk application).

In some embodiments, the audio channel and the third audio channel are managed by the first application.

In some embodiments, the computer system outputs an audio signal (e.g., a chime) when a selectable option that causes sending of one or more audio messages via the audio channel is selected. In some embodiments, the computer system outputs an audio signal (e.g., a chime) when an error associated with the audio channel is detected. In some embodiments, the computer system outputs an audio signal (e.g., a chime) when one or more audio messages received via the audio channel are being outputted.

In some embodiments, the audio channel is managed by the first application; and the first application is a third-party application that is developed and/or provided by a party other than the party that developed and/or provided the system software in some embodiments, the hardware of the computer system).

In some embodiments, while displaying a second user interface of the first application (e.g., 616), the computer system receives a set of one or more user inputs corresponding to a request to open a fourth audio channel that is managed by the first application; and in response to the set of one or more user inputs, the computer system: opens the fourth audio channel; and displays a second system user interface (e.g., 618) that is generated by the system software (e.g., not generated by the first application). In some embodiments, the second system user interface includes an indication that the fourth audio channel has been opened. In some embodiments, the second system user interface includes one or more selectable options for managing the fourth audio channel. In some embodiments, the second system user interface overlaps a portion of the second user interface of the first application. Displaying the second system user interface provides the user with improved visual feedback as to the opened status of the fourth audio channel.

In some embodiments, the audio channel is a half-duplex audio channel in some embodiments, a simulated half-duplex audio channel) that is either in a transmission/sending mode or a receiving/outputting mode at any given time.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the management of audio channels. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide audio channels that are of greater interest to the user. Accordingly, use of such personal information data enables users to have calculated control of recommended channels. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of audio channel recommendation services, the present technology can be configured to allow users to select to "opt in" or "opt out" of participation in the collection of personal information data during registration for services or anytime thereafter. In another example, users can select not to provide mood-associated data for targeted recommendation of audio channels. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, recommended audio channels can be selected and delivered to users by inferring preferences based on non-personal information data or a bare minimum amount of personal information, such as the content being requested by the device associated with a user, other non-personal information available to the audio channel recommendation service, or publicly available information.

What is claimed is:

1. A computer system configured to communicate with a display generation component and an input device, comprising:
   one or more processors; and
   memory storing one or more programs configured to be executed by the one or more processors, the one or more programs including instructions for:
      while an audio channel is open to send audio messages from the computer system and to receive audio messages at the computer system:
         displaying, via the display generation component, a system user interface that is generated by system software;
         while displaying the system user interface detecting, via the input device, a first input;
         in response to detecting the first input, displaying, via the display generation component, an audio channel management user interface that is generated by the system software, wherein the audio channel management user interface includes a first selectable option that, when selected, causes the computer system to perform a first type of operation associated with the audio channel;
         while displaying the audio channel management user interface, detecting a second input directed to the first selectable option; and
         in response to detecting the second input, performing a first operation of the first type of operation associated with the audio channel, including:
            in accordance with a determination that the audio channel is being managed by a first application, the first operation of the first type is associated with the first application; and
            in accordance with a determination that the audio channel is being managed by a second application that is different from the first application, the first operation of the first type is associated with the second application.

2. The computer system of claim 1, wherein the audio channel is managed by the first application, the one or more programs further including instructions for:
   after the audio channel is closed and while a second audio channel that is managed by the second application is open to send audio messages from the computer system and to receive audio messages at the computer system, displaying, via the display generation component, the system user interface that is generated by the system software;
   while displaying the system user interface and while the second audio channel is open, detecting, via the input device, a third input;

in response to detecting the third input, displaying, via the display generation component, the audio channel management user interface that is generated by the system software and that includes the first selectable option;

while the second audio channel is open, detecting, via the input device, a fourth input directed to the first selectable option; and in response to detecting fourth input, performing a second operation of the first type of operation associated with the audio channel, wherein the second operation of the first type is associated with the second application.

3. The computer system of claim 1, wherein the system user interface is a wake screen of the computer system that is displayed upon reactivation of the display generation component from an inactive state.

4. The computer system of claim 1, wherein the system user interface is a primary screen of an operating system of the computer system.

5. The computer system of claim 1, wherein displaying the audio channel management user interface that is generated by the system software includes replacing display of the system user interface with display of the audio channel management user interface.

6. The computer system of claim 1, wherein displaying the audio channel management user interface that is generated by the system software includes maintaining display of at least a portion of the system user interface.

7. The computer system of claim 1, wherein the audio channel management user interface includes a second selectable option that, when selected, causes the computer system to perform a second type of operation associated with the audio channel that is different from the first type of operation, the one or more programs further including instructions for:

while displaying the audio channel management user interface, detecting a fifth input directed to the second selectable option; and in response to detecting the fifth input, performing a first operation of the second type of operation associated with the audio channel, including:

in accordance with a determination that the audio channel is being managed by the first application, the first operation of the second type is associated with the first application; and in accordance with a determination that the audio channel is being managed by the second application, the first operation of the second type is associated with the second application.

8. The computer system of claim 1, wherein the first type of operation associated with the audio channel includes displaying an application user interface of an application that manages the audio channel.

9. The computer system of claim 1, wherein the first type of operation associated with the audio channel includes sending one or more audio messages from the computer system via the audio channel.

10. The computer system of claim 1, wherein the first type of operation associated with the audio channel includes ceasing sending one or more audio messages from the computer system via the audio channel.

11. The computer system of claim 1, wherein the audio channel management user interface includes a fourth selectable option that, when selected, causes the computer system to close the audio channel.

12. The computer system of claim 1, wherein the computer system is in communication with an audio output device, the one or more programs further including instructions for:

while the audio channel is open to send audio messages from the computer system and to receive audio messages at the computer system, receiving, via the audio channel, a first audio message; and in response to receiving the first audio message, outputting, via the audio output device, the first audio message.

13. The computer system of claim 1, wherein the first input is an input corresponding to an eighth selectable option that is displayed in a status region of the system user interface.

14. The computer system of claim 1, the one or more programs further including instructions for:

while the audio channel is open and a third audio channel is inactive, receiving a seventh input that corresponds to a request to switch audio channels; and in response to the seventh input:
opening the third audio channel; and
inactivating the audio channel.

15. The computer system of claim 1, wherein:
the audio channel is managed by the first application; and
the first application is a third-party application that is developed and/or provided by a party other than the party that developed and/or provided the system software.

16. The computer system of claim 1, the one or more programs further including instruction for:

while displaying a second user interface of the first application, receiving a set of one or more user inputs corresponding to a request to open a fourth audio channel that is managed by the first application; and in response to the set of one or more user inputs:
opening the fourth audio channel; and
displaying a second system user interface that is generated by the system software.

17. A non-transitory computer-readable storage medium storing one or more programs configured to be executed by one or more processors of a computer system that is in communication with a display generation component and an input device, the one or more programs including instructions for:

while an audio channel is open to send audio messages from the computer system and to receive audio messages at the computer system:

displaying, via the display generation component, a system user interface that is generated by system software;

while displaying the system user interface detecting, via the input device, a first input;

in response to detecting the first input, displaying, via the display generation component, an audio channel management user interface that is generated by the system software, wherein the audio channel management user interface includes a first selectable option that, when selected, causes the computer system to perform a first type of operation associated with the audio channel;

while displaying the audio channel management user interface, detecting a second input directed to the first selectable option; and in response to detecting the second input, performing a first operation of the first type of operation associated with the audio channel, including:

in accordance with a determination that the audio channel is being managed by a first application, the first operation of the first type is associated with the first application; and in accordance with a determination that the audio channel is being managed by a second application that is different from the first application, the first operation of the first type is associated with the second application.

18. A method comprising:

at a computer system that is in communication with a display generation component and an input device:
while an audio channel is open to send audio messages from the computer system and to receive audio messages at the computer system:
displaying, via the display generation component, a system user interface that is generated by system software;
while displaying the system user interface detecting, via the input device, a first input;
in response to detecting the first input, displaying, via the display generation component, an audio channel management user interface that is generated by the system software, wherein the audio channel management user interface includes a first selectable option that, when selected, causes the computer system to perform a first type of operation associated with the audio channel;
while displaying the audio channel management user interface, detecting a second input directed to the first selectable option; and
in response to detecting the second input, performing a first operation of the first type of operation associated with the audio channel, including:
in accordance with a determination that the audio channel is being managed by a first application, the first operation of the first type is associated with the first application; and
in accordance with a determination that the audio channel is being managed by a second application that is different from the first application, the first operation of the first type is associated with the second application.

19. The non-transitory computer-readable storage medium of claim 17, wherein the audio channel is managed by the first application, the one or more programs further including instructions for:
after the audio channel is closed and while a second audio channel that is managed by the second application is open to send audio messages from the computer system and to receive audio messages at the computer system, displaying, via the display generation component, the system user interface that is generated by the system software;
while displaying the system user interface and while the second audio channel is open, detecting, via the input device, a third input;
in response to detecting the third input, displaying, via the display generation component, the audio channel management user interface that is generated by the system software and that includes the first selectable option;
while the second audio channel is open, detecting, via the input device, a fourth input directed to the first selectable option; and
in response to detecting fourth input, performing a second operation of the first type of operation associated with the audio channel, wherein the second operation of the first type is associated with the second application.

20. The non-transitory computer-readable storage medium of claim 17, wherein the system user interface is a wake screen of the computer system that is displayed upon reactivation of the display generation component from an inactive state.

21. The non-transitory computer-readable storage medium of claim 17, wherein the system user interface is a primary screen of an operating system of the computer system.

22. The non-transitory computer-readable storage medium of claim 17, wherein displaying the audio channel management user interface that is generated by the system software includes replacing display of the system user interface with display of the audio channel management user interface.

23. The non-transitory computer-readable storage medium of claim 17, wherein displaying the audio channel management user interface that is generated by the system software includes maintaining display of at least a portion of the system user interface.

24. The non-transitory computer-readable storage medium of claim 17, wherein the audio channel management user interface includes a second selectable option that, when selected, causes the computer system to perform a second type of operation associated with the audio channel that is different from the first type of operation, the one or more programs further including instructions for:
while displaying the audio channel management user interface, detecting a fifth input directed to the second selectable option; and
in response to detecting the fifth input, performing a first operation of the second type of operation associated with the audio channel, including:
in accordance with a determination that the audio channel is being managed by the first application, the first operation of the second type is associated with the first application; and
in accordance with a determination that the audio channel is being managed by the second application, the first operation of the second type is associated with the second application.

25. The non-transitory computer-readable storage medium of claim 17, wherein the first type of operation associated with the audio channel includes displaying an application user interface of an application that manages the audio channel.

26. The non-transitory computer-readable storage medium of claim 17, wherein the first type of operation associated with the audio channel includes sending one or more audio messages from the computer system via the audio channel.

27. The non-transitory computer-readable storage medium of claim 17, wherein the first type of operation associated with the audio channel includes ceasing sending one or more audio messages from the computer system via the audio channel.

28. The non-transitory computer-readable storage medium of claim 17, wherein the audio channel management user interface includes a fourth selectable option that, when selected, causes the computer system to close the audio channel.

29. The non-transitory computer-readable storage medium of claim 17, wherein the computer system is in communication with an audio output device, the one or more programs further including instructions for:

while the audio channel is open to send audio messages from the computer system and to receive audio messages at the computer system, receiving, via the audio channel, a first audio message; and in response to receiving the first audio message, outputting, via the audio output device, the first audio message.

30. The non-transitory computer-readable storage medium of claim 17, wherein the first input is an input corresponding to an eighth selectable option that is displayed in a status region of the system user interface.

31. The non-transitory computer-readable storage medium of claim 17, the one or more programs further including instructions for:

while the audio channel is open and a third audio channel is inactive, receiving a seventh input that corresponds to a request to switch audio channels; and in response to the seventh input:
opening the third audio channel; and
inactivating the audio channel.

32. The non-transitory computer-readable storage medium of claim 17, wherein:

the audio channel is managed by the first application; and
the first application is a third-party application that is developed and/or provided by a party other than the party that developed and/or provided the system software.

33. The non-transitory computer-readable storage medium of claim 17, the one or more programs further including instruction for:

while displaying a second user interface of the first application, receiving a set of one or more user inputs corresponding to a request to open a fourth audio channel that is managed by the first application; and in response to the set of one or more user inputs:
opening the fourth audio channel; and
displaying a second system user interface that is generated by the system software.

34. The method of claim 18, wherein the audio channel is managed by the first application, the method further comprising:

after the audio channel is closed and while a second audio channel that is managed by the second application is open to send audio messages from the computer system and to receive audio messages at the computer system, displaying, via the display generation component, the system user interface that is generated by the system software;

while displaying the system user interface and while the second audio channel is open, detecting, via the input device, a third input;

in response to detecting the third input, displaying, via the display generation component, the audio channel management user interface that is generated by the system software and that includes the first selectable option;

while the second audio channel is open, detecting, via the input device, a fourth input directed to the first selectable option; and in response to detecting fourth input, performing a second operation of the first type of operation associated with the audio channel, wherein the second operation of the first type is associated with the second application.

35. The method of claim 18, wherein the system user interface is a wake screen of the computer system that is displayed upon reactivation of the display generation component from an inactive state.

36. The method of claim 18, wherein the system user interface is a primary screen of an operating system of the computer system.

37. The method of claim 18, wherein displaying the audio channel management user interface that is generated by the system software includes replacing display of the system user interface with display of the audio channel management user interface.

38. The method of claim 18, wherein displaying the audio channel management user interface that is generated by the system software includes maintaining display of at least a portion of the system user interface.

39. The method of claim 18, wherein the audio channel management user interface includes a second selectable option that, when selected, causes the computer system to perform a second type of operation associated with the audio channel that is different from the first type of operation, the method further comprising:

while displaying the audio channel management user interface, detecting a fifth input directed to the second selectable option; and in response to detecting the fifth input, performing a first operation of the second type of operation associated with the audio channel, including:

in accordance with a determination that the audio channel is being managed by the first application, the first operation of the second type is associated with the first application; and in accordance with a determination that the audio channel is being managed by the second application, the first operation of the second type is associated with the second application.

40. The method of claim 18, wherein the first type of operation associated with the audio channel includes displaying an application user interface of an application that manages the audio channel.

41. The method of claim 18, wherein the first type of operation associated with the audio channel includes sending one or more audio messages from the computer system via the audio channel.

42. The method of claim 18, wherein the first type of operation associated with the audio channel includes ceasing sending one or more audio messages from the computer system via the audio channel.

43. The method of claim 18, wherein the audio channel management user interface includes a fourth selectable option that, when selected, causes the computer system to close the audio channel.

44. The method of claim 18, wherein the computer system is in communication with an audio output device, the method further comprising:

while the audio channel is open to send audio messages from the computer system and to receive audio messages at the computer system, receiving, via the audio channel, a first audio message; and in response to receiving the first audio message, outputting, via the audio output device, the first audio message.

45. The method of claim 18, wherein the first input is an input corresponding to an eighth selectable option that is displayed in a status region of the system user interface.

46. The method of claim 18, further comprising:

while the audio channel is open and a third audio channel is inactive, receiving a seventh input that corresponds to a request to switch audio channels; and in response to the seventh input:
opening the third audio channel; and
inactivating the audio channel.

47. The method of claim 18, wherein:

the audio channel is managed by the first application; and the first application is a third-party application that is developed and/or provided by a party other than the party that developed and/or provided the system software.

48. The method of claim 18, further comprising:

while displaying a second user interface of the first application, receiving a set of one or more user inputs corresponding to a request to open a fourth audio channel that is managed by the first application; and in response to the set of one or more user inputs:
- opening the fourth audio channel; and
- displaying a second system user interface that is generated by the system software.

* * * * *